United States Patent
Cubukcu et al.

[11] Patent Number: 6,132,573
[45] Date of Patent: Oct. 17, 2000

[54] CERAMIC COMPOSITE ELECTROLYTIC DEVICE AND METHODS FOR MANUFACTURE THEREOF

[75] Inventors: Esin Cubukcu, Auburn; Steve Dahar, Solon; Ravi Dodeja, Richmond Heights; Arnold Z. Gordon, Beachwood; Daniel Kalynchuk, University Heights; Troy Shannon Prince, Vermilion; Justin Soltesz, Wadsworth; Mike Waite, Strongsville, all of Ohio

[73] Assignee: IGR Enterprises, Inc., Beachwood, Ohio

[21] Appl. No.: 08/985,702

[22] Filed: Dec. 5, 1997

[51] Int. Cl.⁷ .................. C25B 9/00; C25C 7/00
[52] U.S. Cl. ........................................ 204/262
[58] Field of Search ............... 204/421, 271, 204/274, 278

[56] References Cited

U.S. PATENT DOCUMENTS

| | | | |
|---|---|---|---|
| 3,922,411 | 11/1975 | Motta et al. | 428/116 |
| 4,246,081 | 1/1981 | Winnick | 204/130 |
| 4,276,331 | 6/1981 | Bothwell | 428/36 |
| 4,376,374 | 3/1983 | Bothwell | 60/687 |
| 4,475,994 | 10/1984 | Gagne et al. | 204/129 |
| 4,547,277 | 10/1985 | Lawless | 204/252 |
| 4,764,488 | 8/1988 | Saito et al. | 501/95 |
| 4,867,902 | 9/1989 | Russell | 252/186.32 |
| 4,877,506 | 10/1989 | Fee et al. | 204/242 |
| 4,879,016 | 11/1989 | Joshi | 204/242 |
| 4,885,142 | 12/1989 | Suitor et al. | 423/219 |
| 4,980,037 | 12/1990 | Hossain et al. | 204/130 |
| 5,022,975 | 6/1991 | Gordon | 204/277 |
| 5,034,023 | 7/1991 | Thompson | 55/2 |
| 5,045,169 | 9/1991 | Feduska et al. | 204/258 |
| 5,108,465 | 4/1992 | Bauer et al. | 55/16 |
| 5,160,713 | 11/1992 | Mazanec et al. | 423/210 |
| 5,169,415 | 12/1992 | Roettger et al. | 55/68 |
| 5,205,990 | 4/1993 | Lawless | 422/121 |
| 5,240,473 | 8/1993 | Carolan et al. | 95/54 |
| 5,240,480 | 8/1993 | Thorogood et al. | 96/4 |
| 5,261,932 | 11/1993 | Carolan et al. | 95/54 |
| 5,269,822 | 12/1993 | Carolan et al. | 95/54 |
| 5,273,628 | 12/1993 | Liu et al. | 204/59 R |
| 5,273,837 | 12/1993 | Aitken et al. | 429/30 |
| 5,298,341 | 3/1994 | Khandkar et al. | 429/32 |
| 5,302,258 | 4/1994 | Renlund et al. | 204/129 |
| 5,332,483 | 7/1994 | Gordon | 204/265 |
| 5,342,431 | 8/1994 | Anderson et al. | 95/45 |
| 5,409,371 | 4/1995 | Gordon | 431/127 |
| 5,441,610 | 8/1995 | Renlund et al. | 204/129 |
| 5,447,555 | 9/1995 | Yee et al. | 95/54 |
| 5,514,353 | 5/1996 | Adlhart | 422/239 |
| 5,547,494 | 8/1996 | Prasad et al. | 95/54 |
| 5,611,898 | 3/1997 | Guhman et al. | 204/427 |
| 5,624,542 | 4/1997 | Shen et al. | 204/283 |
| 5,643,355 | 7/1997 | Phillips et al. | 96/4 |
| 5,681,373 | 10/1997 | Taylor et al. | 96/11 |
| 5,711,865 | 1/1998 | Ceasar et al. | 205/628 |
| 5,733,435 | 3/1998 | Prasad et al. | 205/765 |
| 5,766,317 | 6/1998 | Cable et al. | 96/10 |
| 5,788,748 | 8/1998 | Mazanec et al. | 96/4 |

FOREIGN PATENT DOCUMENTS 761284  3/1997  European Pat. Off. .

Primary Examiner—Kathryn Gorgos
Assistant Examiner—Erica Smith-Hicks
Attorney, Agent, or Firm—Calfee, Halter & Griswold LLP

[57] ABSTRACT

An oxygen or ozone generating device having a plurality of ceramic composite cells, a resistance heat element, a cathode, an anode, a gas manifold interconnecting a gas output passageway from each of the cells, and a thermal shell in which the ceramic composite cells are stacked or arranged in electrical series and gas parallel surrounded by shock absorbing and insulating materials, respectively. Also provided are an exhaust fan, thermocouple sensors, a power source, a programmable computer controller with user interface, and a container supporting the computer user interface and having passageways for providing air into the device, and an oxygen output for supplying oxygen from the device. Methods for manufacturing the ceramic composite cells are also provided, including a method for manufacturing bismuth baria oxide and bismuth calcia baria oxide for use in the ceramic materials used within the ceramic composite cell.

8 Claims, 22 Drawing Sheets

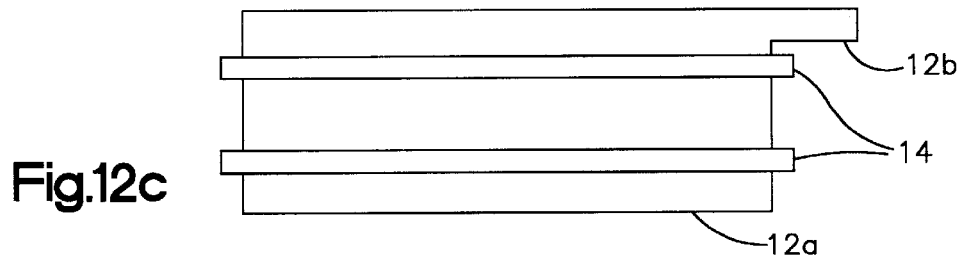
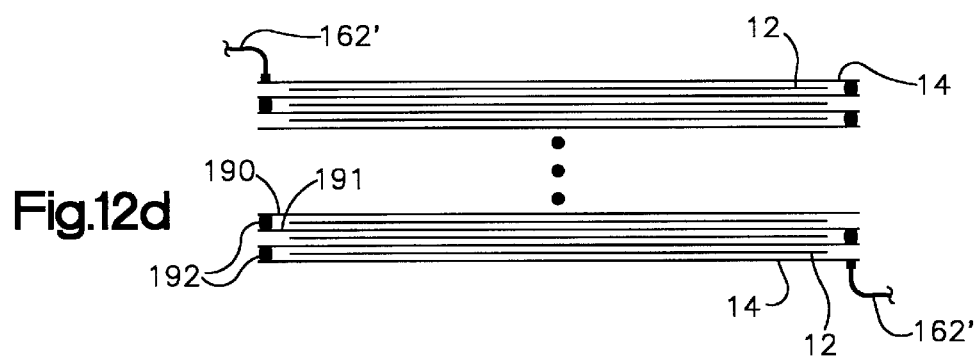
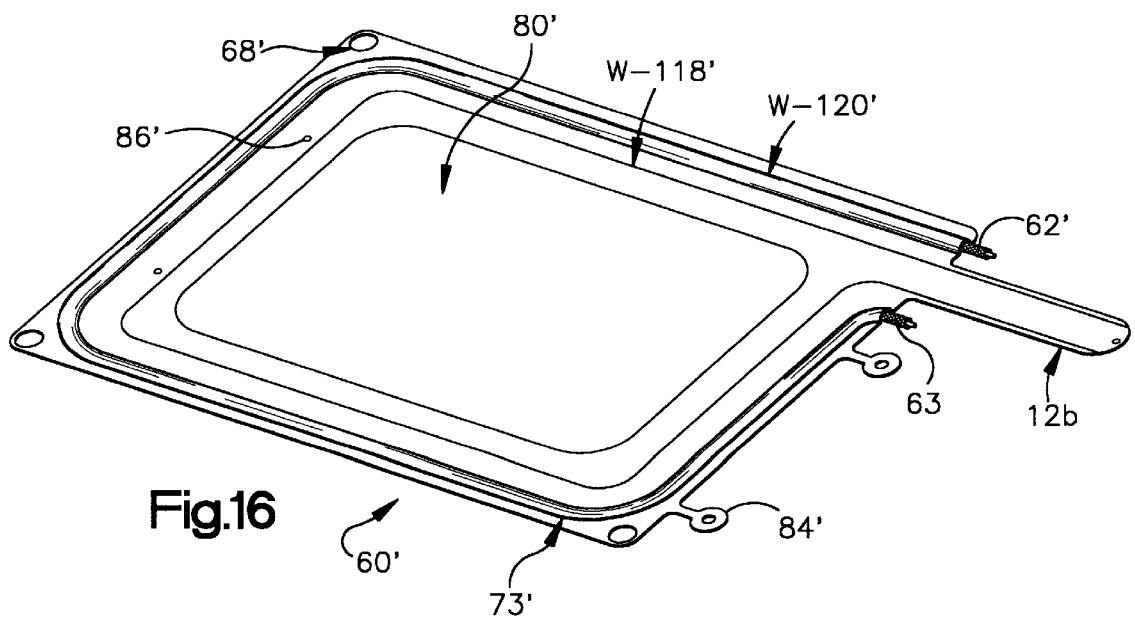

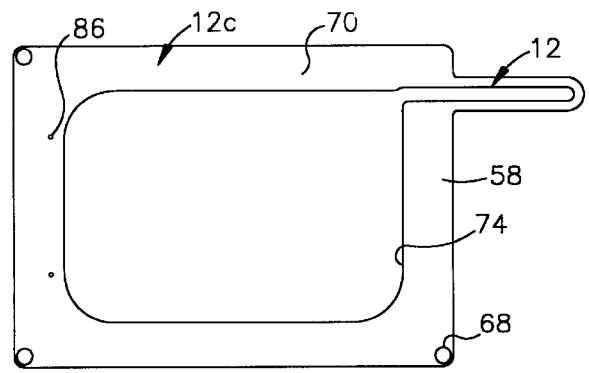
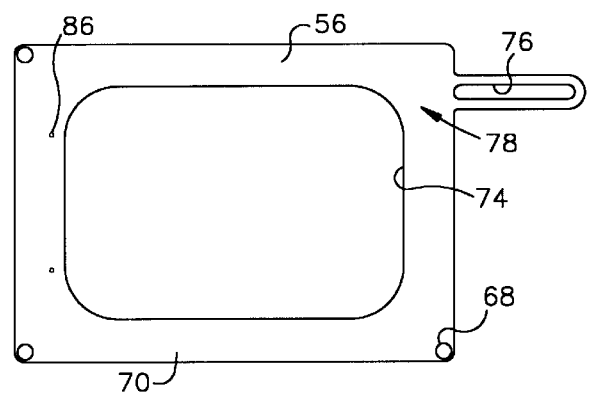
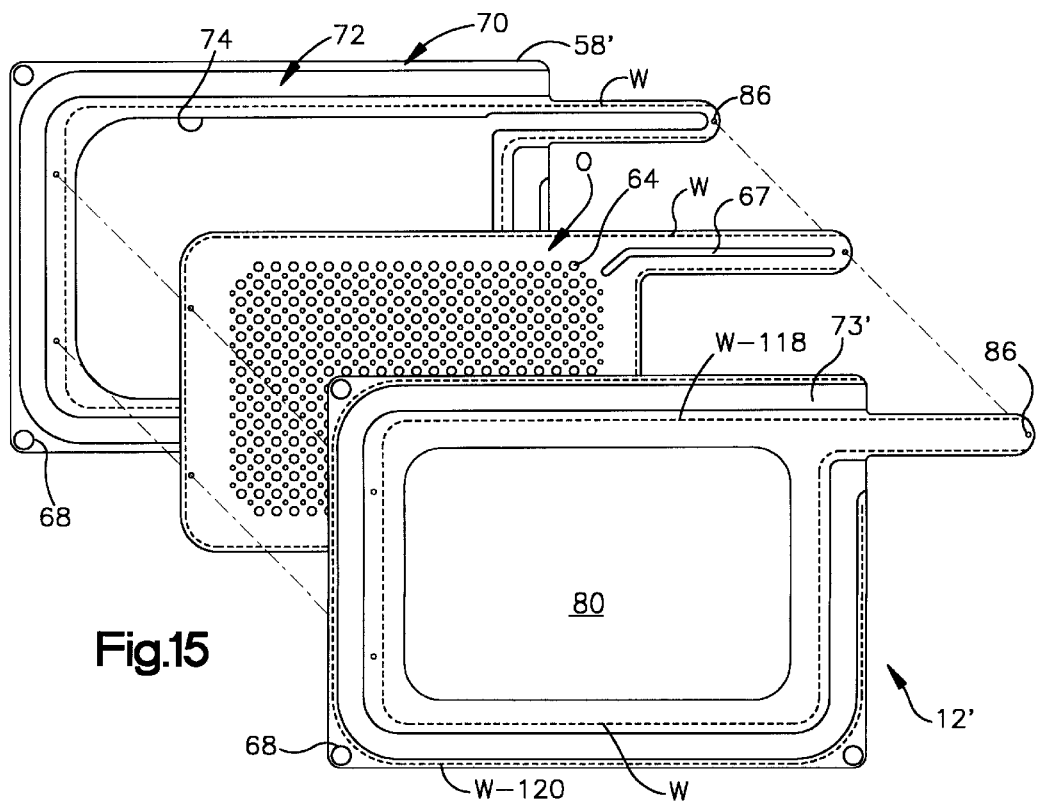

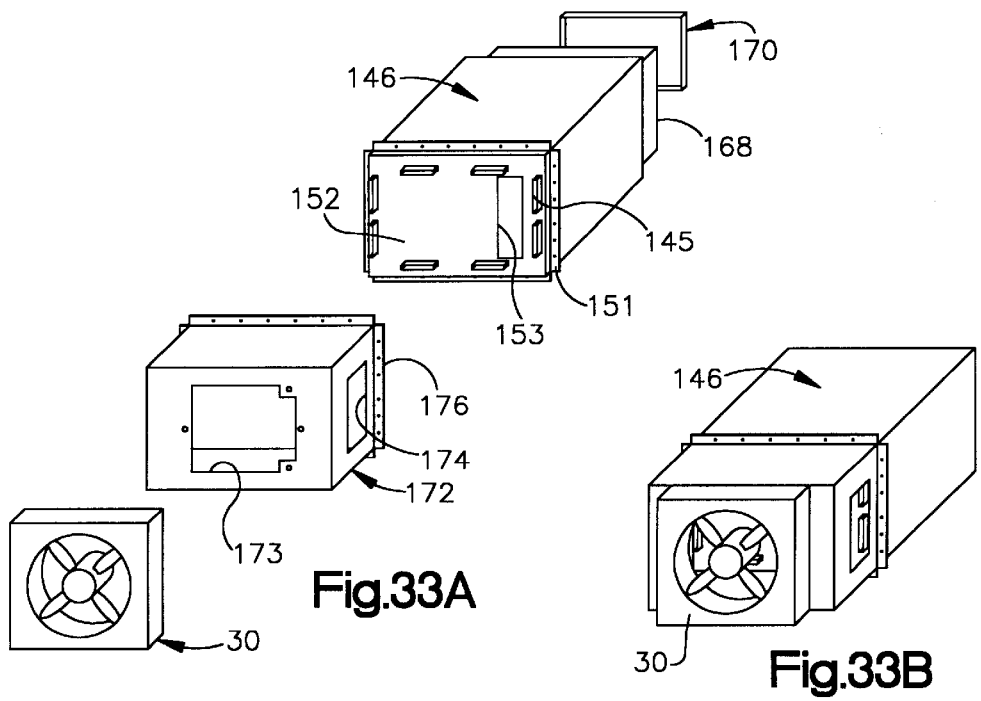
Fig.33A
Fig.33B
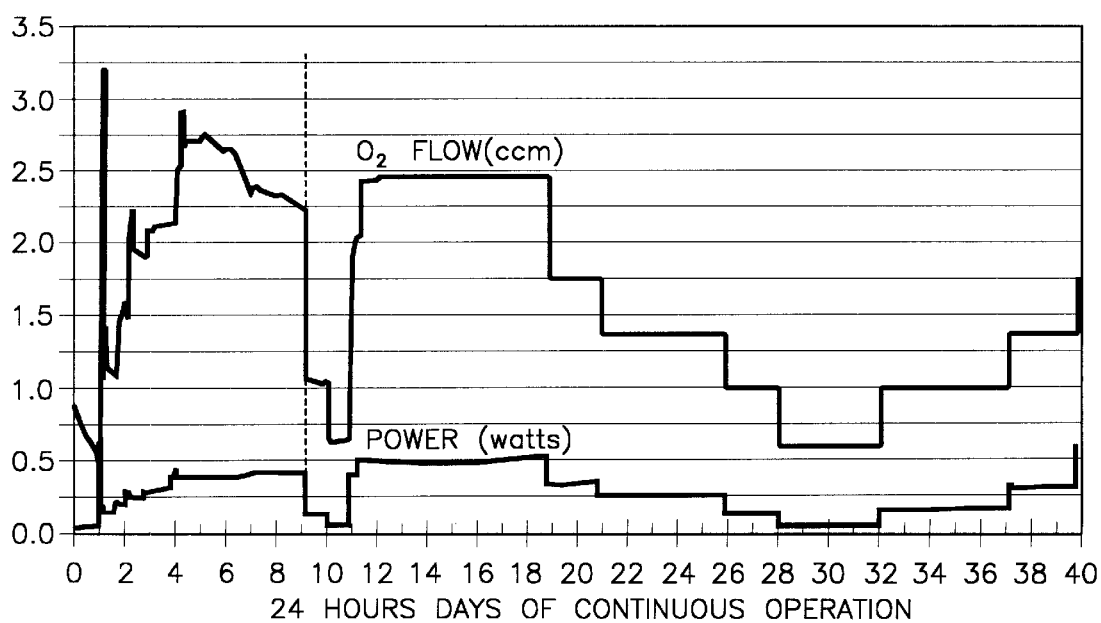
Fig.34

CERAMIC COMPOSITE ELECTROLYTIC DEVICE AND METHODS FOR MANUFACTURE THEREOF

TECHNICAL FIELD

The present invention relates generally to a ceramic composite electrolytic device, and, more specifically, to a device and methods for manufacturing a ceramic composite electrolytic device for use in the generation of an oxidizing gas such as oxygen or ozone.

BACKGROUND

In the past, portable and stationary ceramic electrolytic devices for generation of oxygen have been difficult to manufacture for numerous reasons. First, numerous prior art devices used ceramic-to-ceramic type fabrication techniques which resulted in a product which was not sufficiently tough to be reliable during transport or usage. The ceramic materials used and the ceramic-to-ceramic interface were brittle and would tend to crack readily. Additionally, fabrication costs for such units were high due to the use of expensive ceramic materials. Such fabrication techniques may also have included expensive permanent or hermetic gas seals. Prior art units also tend to have difficulty controlling and adjusting output flow rate, are not small enough to meet desired space and weight requirements, and have high power requirements which are in excess of desired limits. Moreover, such devices were unable to meet desired output requirements despite such additional disadvantages. The devices are typically useful for medical, disinfecting, sterilizing, cutting, welding or other industrial oxygen applications, and this requires consistent and reliable output. For example, in the case of an oxygen generator, continuous output requirements in the range of at least 2–3 liters per minute must be obtained, with levels of at least 5–15 liters per minute being desired.

Additional disadvantages with prior art techniques are set forth in the background of U.S. Pat. No. 5,332,483 concerning oxygen generation systems which is incorporated herein by reference. Still further enhancements continue to be made to the mechanical properties of ceramic cell technology as discussed in U.S. Pat. No. 5,624,542. However, such improvements continue to have disadvantages, including the use of expensive precious metals such as silver and palladium as structural components. Also, the use of increased amounts of metal in the composite results in undesirable direct electrical connections, which limit the usefulness of the cell in certain applications.

SUMMARY OF THE INVENTION

According to the present invention, a ceramic composite electrolytic device is provided which may be used for generation of an oxidizing gas such as oxygen or ozone, together with its methods of manufacture. In the oxygen generation system or device of the present application, a reliable, mechanically rugged, electrically or pressure driven device is provided. In particular, such device is preferably portable, has low power requirements, and is capable of delivering oxygen in one embodiment at a rate of at least 2–3 liters per minute, and in a second embodiment at a rate of at least 5 liters per minute. Such devices are advantageously used in the production of pure, sterile oxygen in any appropriate civilian or military application, such as home use, or emergency or battlefield conditions, for example in battlefield intra-operative and post-operative intensive care unit applications.

The present device is a solid-state electrochemical source of oxygen. The device cathodically reduces the oxygen in an ambient air stream or other oxygen containing stream, then transports the resulting oxide ions ($O^{-2}$) across a gas-tight electrolytic ductile or non-brittle ceramic barrier, as compared to the ceramic alone. Finally, the oxide ions are re-oxidized to oxygen gas at an anode. If ozone is desired, the resulting oxygen gas is then passed over an energetic site such as an ultraviolet source or electrical spark. The use of the flexible solid electrolytic cell combines a highly ionically conductive ceramic oxide with a high tensile strength metallic support enabling a flexible, ductile cell which exhibits enhanced mechanical properties compared to the ceramic alone.

Other features and advantages of the present device will become apparent from the following detailed description of the preferred embodiments made with reference to the accompanying drawings, which form a part of the specification.

BRIEF DESCRIPTION OF DRAWINGS

In the accompanying drawings, which are incorporated in and constitute a part of this specification, embodiments of the devices described are illustrated, and together with the general description above, and the detailed description below, exemplify the present invention.

FIG. 12c is a schematic top plan view of the heater strips engaged with the cell in the embodiment of the device of FIGS. 12a and 12b;

FIG. 12d is a schematic side view of the cell stack in the embodiment of the device of FIGS. 12a and 12b, showing the welded heater strips of adjacent cells;

FIGS. 13 and 14 are schematic, top plan views of the mating frame members which form the frame of the ceramic composite cell;

FIG. 15 is a schematic, partial exploded view of on embodiment of the components of the ceramic composite cell of the device of the present application;

FIG. 16 is a schematic, perspective view of an alternate embodiment of the photolithogaphic foil member of the ceramic composite cell;

FIGS. 33A–33B are partial, schematic exploded views of steps A–B of assembly of the thermal shell with the fan assembly of the device;

FIG. 34 is a graph of gas flow from the device of the present application;

DETAILED DESCRIPTION OF THE PREFERRED EMBODIMENTS

Figure 1:
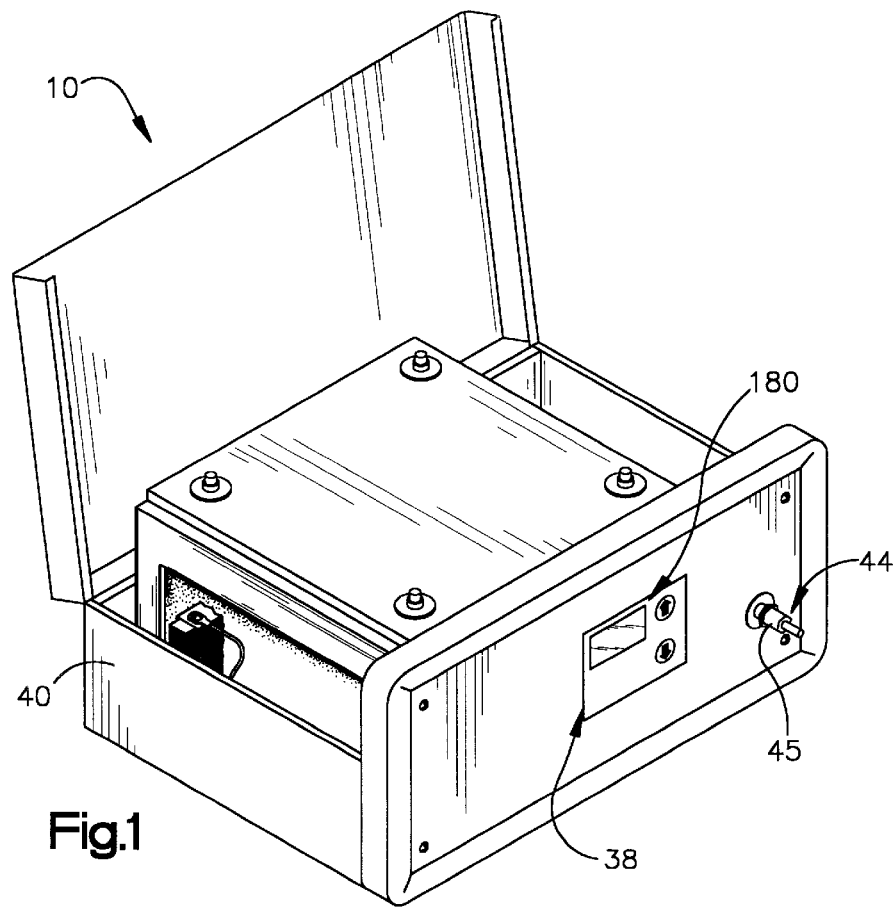
FIG. 1 is a partial perspective view of an open oxygen generating device of the present application.

FIG. 1 is a schematic illustration of the improved oxygen generating device 10 disclosed which preferably produces oxygen gas having an oxygen content of 99% or greater. As illustrated in FIGS. 1 to 32, the device preferably includes: ceramic composite cells 12, a resistance heat element 14, a cathode 16 and an anode 18, a gas manifold 20 interconnecting a gas output passageway 22 from each of the cells, a thermal shell 24 in which the ceramic composite cells are stacked or arranged in electrical series and gas parallel surrounded by shock absorbing and insulating materials 26, 28, respectively, an exhaust fan 30, thermocouple sensors 32, a power source 34, a programmable computer controller 36 with user interface 38, and a container 40 supporting the computer user interface 38 and having passageways 42 for providing air into the device 10 and an oxygen output 44 for supplying oxygen from the device.

Figure 4:
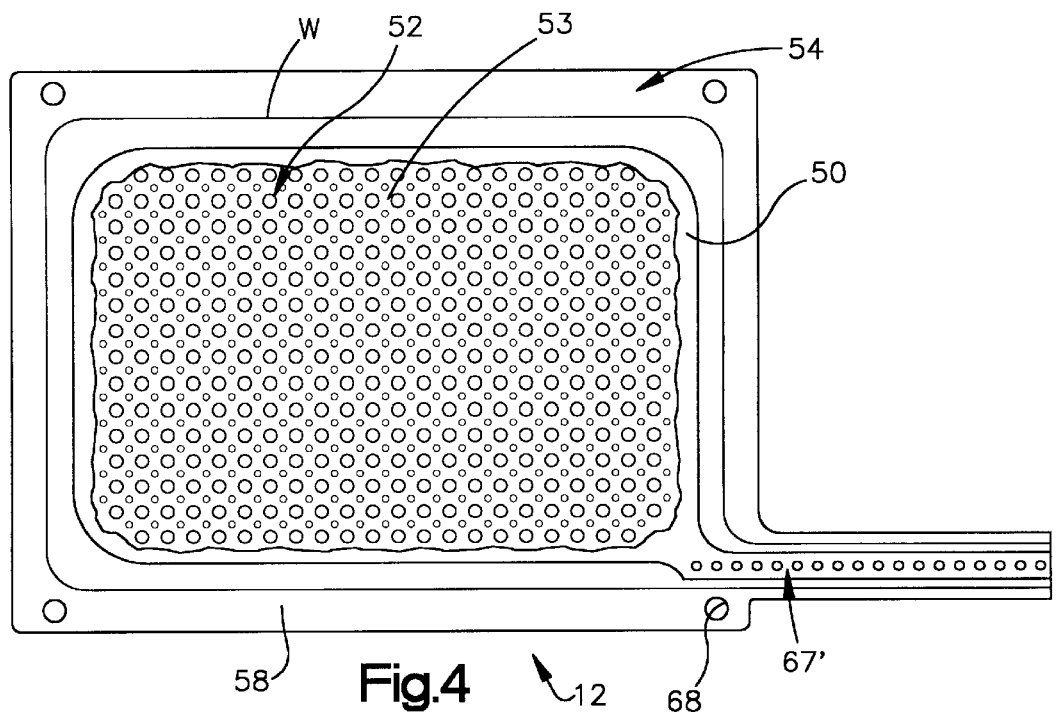
FIG. 4 is a bottom plan view of one embodiment of an assembled ceramic composite cell of the oxygen generating device of FIG. 1.
Figure 5:
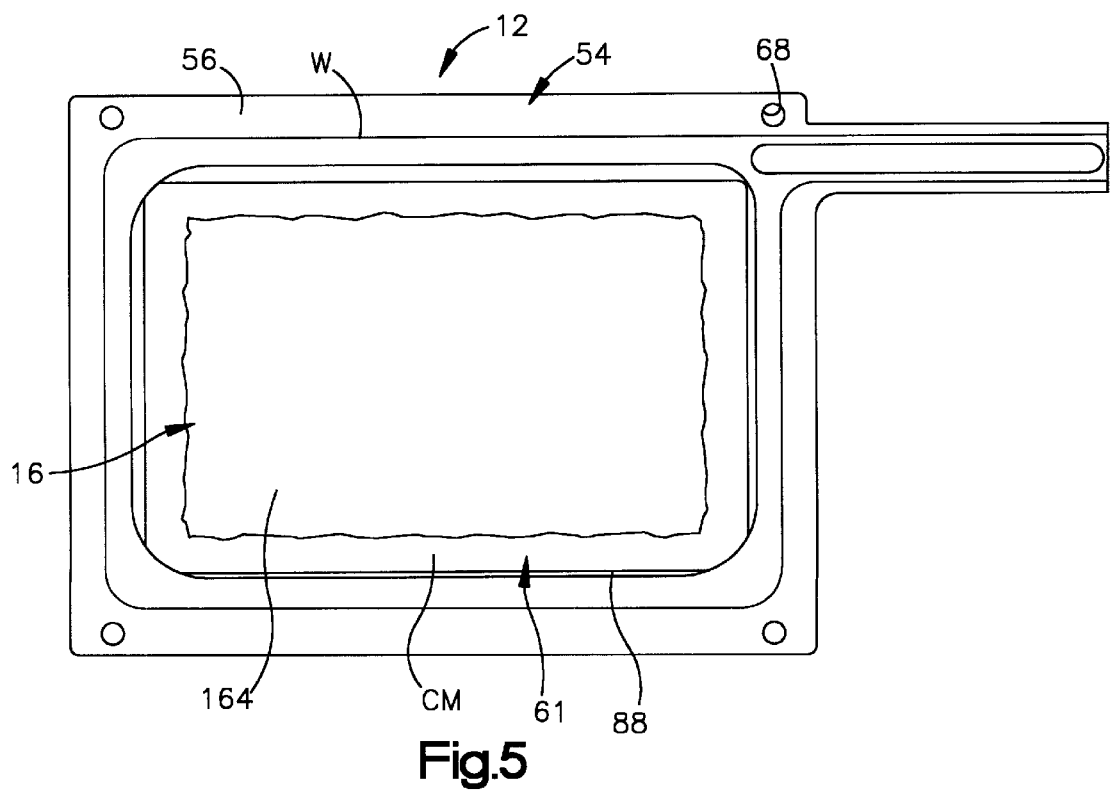
FIG. 5 is a top plan view of the ceramic composite cell of FIG. 4.

In the illustrated embodiment of FIGS. 4–5, the cells 12 are approximately 8 in. by 14 in. in overall dimension, and may have a thickness of approximately 0.005 to 0.20 inches. Generally, approximately 10–20 cells are stacked per linear inch of height, for approximately 2–3 inches. The container 40 preferably has dimensions of approximately 1.25 ft. by 2.5 ft. by 3 ft. The device 10 weighs less than 75 pounds, but may be of a considerably smaller size and weight depending on the specifics of the selected embodiment and the desired output of oxygen. The arrangement of the preferred embodiment illustrated results in oxygen output from the device of approximately 2–3 liters per minute. However, it should be understood that in the event larger oxygen output is desired, adjustment of the dimensions of the cells (to increase the surface area or volume of the cells), as well as the number of cells used, may be required. Alternatively, or additionally, the device may be operated at a higher current density to obtain the desired output.

Ceramic Composite Cells

Figure 6:
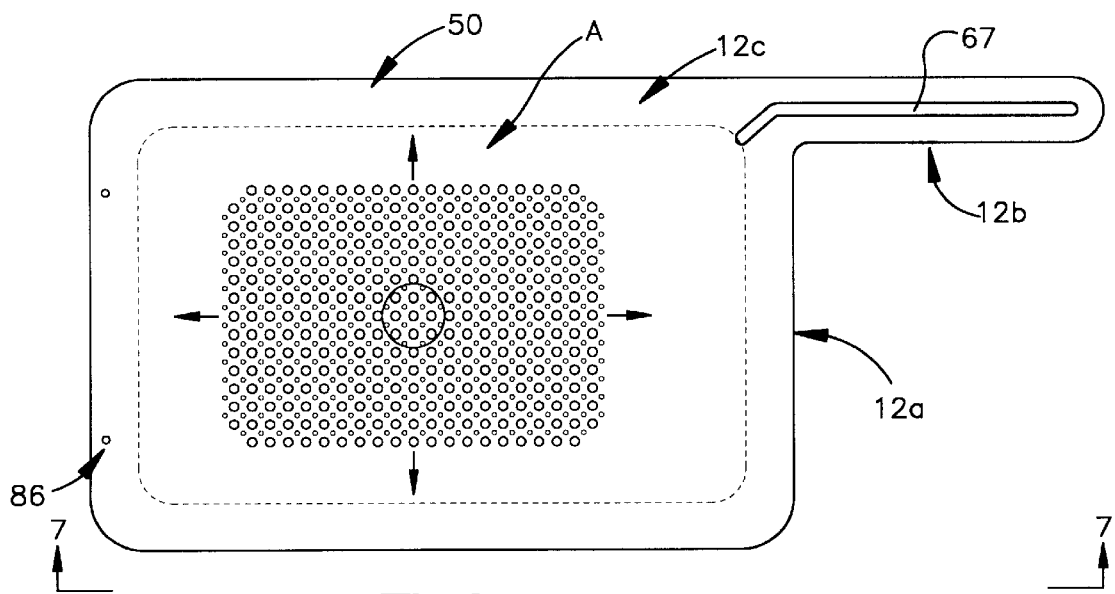
FIG. 6 is a schematic, top plan view of the preferred embodiment of the ceramic composite cell the oxygen generating device of the present application.
Figure 7:
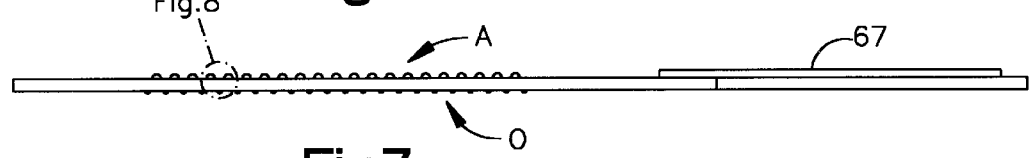
FIG. 7 is a schematic, side view of the preferred embodiment of the ceramic composite cell taken along the line 7—7 of FIG. 6.
Figure 8:
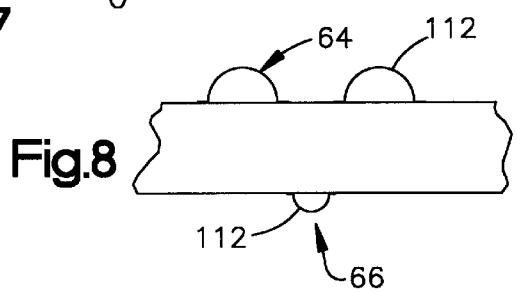
FIG. 8 is a cut-away portion of the schematic, side view of the ceramic composite cell within the box indicated 8 in FIG. 6.
Figure 9:
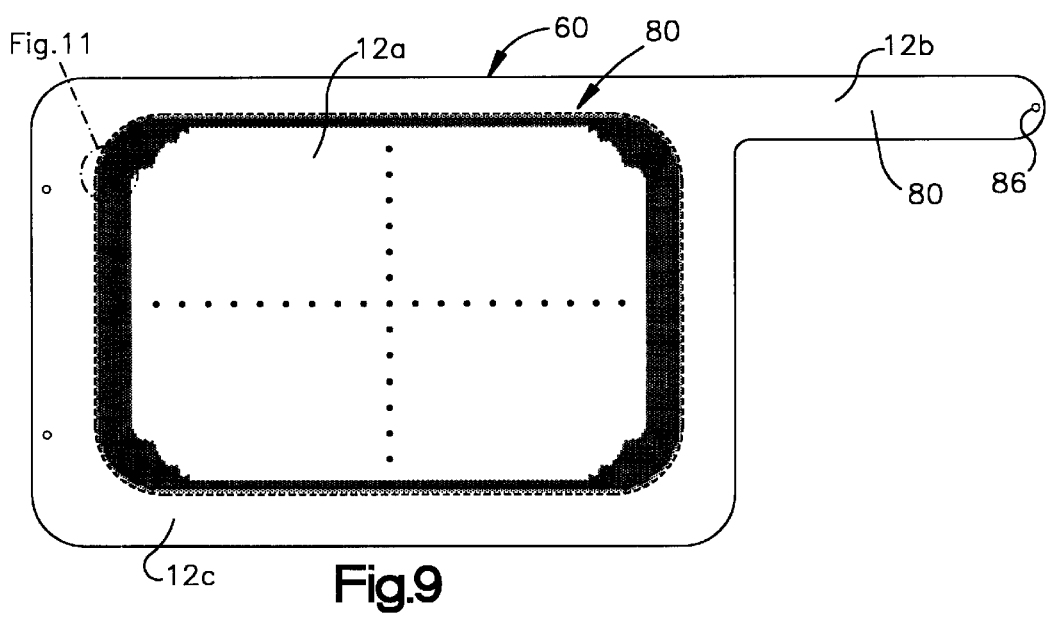
FIG. 9 is a schematic, top plan view of one embodiment of the photolithographic foil member of the ceramic composite cell of the device of the present application.
Figure 10:
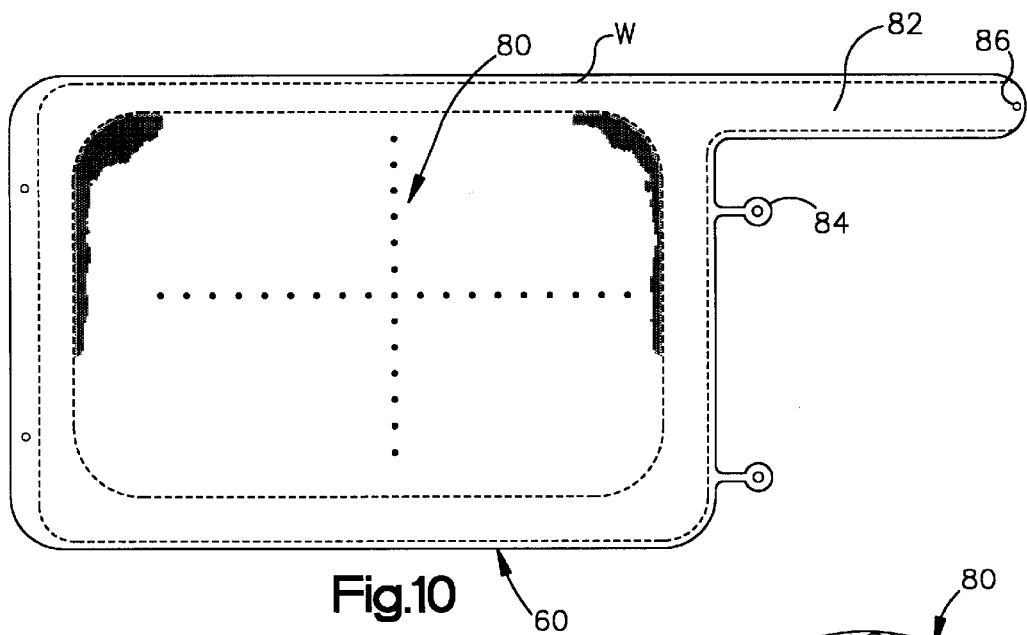
FIG. 10 is a schematic, top plan view of the preferred embodiment of the photolithographic foil member of the ceramic composite cell.
Figure 11:
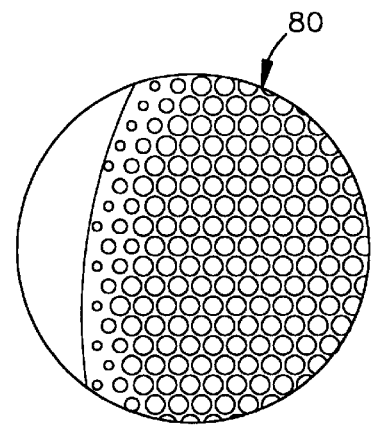
FIG. 11 is a cut-away portion of the schematic, top plan view of the photolithographic foil member within the section indicated 11 in FIG. 9.
Figure 12:
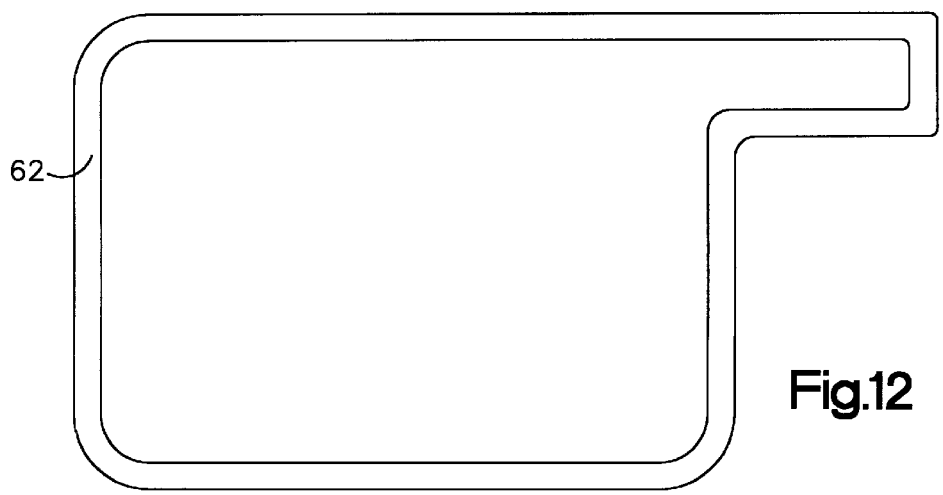
FIG. 12 is a schematic, top plan view of one embodiment of the heat element of the ceramic composite cell.

Turning first to a discussion of the preferred embodiment of the ceramic composite cells 12 illustrated in FIGS. 6 to 16, the cells of the embodiments of the present device include the following components: a bipolar foil 50, preferably having an embossed two dimensional dimple pattern 52 as illustrated in FIGS. 6–8, supports an electrical contact layer 53; a frame 54 having opposite first and second members 56, 58 secured together to surround, support and engage components of the cell; a photolithographic foil member 60 preferably having a hole pattern 62 which is hexagonal close packed, or honeycomb, is illustrated in FIG. 11 and supports the preferred ceramic material; and an optional cell heat element 62, which may include a layer of ceramic insulation 63, is illustrated in FIG. 12.

In the embodiment of FIGS. 4–5 and 15, the cell 12, and each of its component parts, has a substantially rectangular configuration forming a body 12a, a single arm 12b extending therefrom, and with a metal perimeter 12c surrounding the body. Each of the cell components includes the elements of a body 12a, an arm 12b, and a perimeter 12c, which elements will all be referred to using these designations. A portion of the arm 12b forms a gas output plenum or passageway 22. Each of the cell components are welded together along the perimeter 12c at the locations indicated W, preferably using a $CO_2$ laser.

An alternate embodiment of the photolithograhic foil member 60' of the cell is illustrated in FIG. 16. The embodiment includes an embossed portion 73' surrounding the active area of the hole pattern for receiving the heat element 62', and thus only requires a single frame member 58 of the type shown in FIG. 4. A similar alternate embodiment 60" is illustrated in FIG. 15 with an embossed portion 73' for receiving the heat element 62 of the type shown in FIG. 12. It is noted that an alternate ceramic composite cell configured to include the alternate foil member embodiments illustrated, would likewise include other appropriately modified components having a body 12a' and the single arm 12b' extending therefrom. Where other embodiments of the present invention are illustrated, device components are considered substantially similar, and will be referred to with common reference numerals, but with a prime designation, unless other differences are highlighted or discussed herein.

The cells 12 are preferably manufactured as set forth below.

The Bipolar Foil of the Cell

The bipolar foil 50 is cut from 0.002 inch Inconel 600 steel foil. It should be understood that any metal foil which is temperature and oxidation resistant may be used, such as Fe based, Ni based, austenic, martensitic, ferritic and duplex, stainless steels, silver, silver alloys, superalloys and high nickel alloys. A $CO_2$ laser is also used to cut the foil to the size and configuration illustrated in FIG. 6. In operation, one side of the bipolar foil communicates with ambient air, the air side A, and the other side communicates with oxygen, the oxygen side O. Using a cold-forging or embossing process, the foil 50 is then embossed in two directions in the large and small dimple pattern 52 illustrated using a 60,000 pound hydraulic press. The foil 50 is pressed inside a two part die. Aligning pegs are used to ensure accurate placement of the resulting large and small dimples 64, 66 in the foil 50 during pressing. The die is pressed four times at 10,000 pounds in the corners of the foil to obtain the dimple pattern 52. It should be understood that any raised pattern or configuration which allows for gas passage and electrical contact may be embossed on the bipolar foil 50.

In the preferred embodiment, the air side, or cathode side, of the foil is embossed with ⅛ inch ball bearings to create the large dimples 64 which are raised approximately 0.026 inches out of the foil. The oxygen side, or anode side, of the foil is embossed with 3/32 inch ball bearings to create the small dimples 66 which are raised 0.014 inches out of the foil. All of the dimples with the same size diameters are spaced with approximately ¼ inch between their centers. Using the dimple pattern 52 of embossments, as is illustrated and will be further discussed, the anode 18 of one cell 12 is electrically connected directly to the cathode 16 of the adjacent cell 12. Once the cells are stacked and interconnected in the cell stack 13, one lead of the power source goes to the cathode end of the stack, and the other lead to the anode end of the stack. This arrangement results in the linear drop of voltage at constant amperage as the number of cells increases. It also minimizes the material required, and minimizes possible power loss. The mechanical and electrical functions of the bipolar foil are to provide a backing for the photolithographic member 60 by enabling collection of oxygen within the cell and a hermetic gas passageway 22 to direct the oxygen generated on the oxygen side of the foil, to transmit electrical current to the next cell, to provide spacing on the oxygen and air sides of the foil and to evenly distribute the temperature and current flow through the cells.

In FIG. 6, an oxygen egress tube 67 is embossed, using the hydraulic press technique mentioned, in the bipolar foil within the arm 12b portion of the foil to enable the flow of oxygen from the device 10. As shown in FIG. 4, the bipolar foil is embossed with dimples to form the oxygen egress tube 67'. In FIGS. 4 and 5, the terminal end of the arm 12b of the cell 12 is shown cut prior to engagement with the gas manifold 20, such that each tube 67, 67', together with the photolithographic member 60, 60', forms the gas output plenum from each cell 12. It is further noted that the cell embodiments of FIGS. 4 and 5 and 27–28 do not use individual cell heat element 62, 62' within each cell 12.

Once the bipolar foil 50 includes the two-dimensional dimple pattern 52, an electrical contact layer 53 is provided on the tops of both the large and small dimples 64, 66. In the present embodiment, the electrical contact layer 53 is two layers, where each layer is double coated, of silver, alloyed with a small amount of another metal such as gold, platinum, palladium or iridium. The preferred embodiment includes a small amount of gold ink which is mixed with silver ink and stamped on the dimples using a stamp pad coated with the mixture to obtain a thickness of 1/16 inch. However, such material may be applied by plating, painting or any other available coating technique. The commercially available silver and gold inks used are 24% Gold Resinate Solution with 19.4% Metallo Organic Silver Ink, both available from Englehard. The inks are mixed together in a 1 to 1 ratio. Although other proportions are possible depending on the alloy of the bipolar foil member, the desired service temperature, and the amperage.

Following application of a first layer of ink, the bipolar foil is fired to 200° C. for ½ hour, and allowed to cool. Once cooled, the bipolar foil is fired to 650° C. at 5° C. per minute for 60 minutes, and allowed to cool. A second coat of ink is then applied and fired as described. The bipolar foil is then refired to 650° C. at 5° C. per minute for 60 minutes. A second layer of Silver Fritless ink available from Englehard is then used to cover the dimples on one side of the bipolar foil. Following such application, which is by painting, the foil is placed in the furnace and fired to 200° C. for ½ hour, and allowed to cool. Once cooled, the dimples on the opposite side of the foil are then painted and heated as described. Once the dimples on both sides of the foil are coated, the bipolar foil is fired to 650° C. at 5° C. per minute for 60 minutes, and allowed to cool. A second coating of ink layer is then added and fired using the process just described. Such inks provide intimate contact with the surface of the bipolar foil 50.

Alternatively, multiple layer electrical contacts may also be used. In one example, the first layer is a very thin catalytic and/or particularly noble and unreactive metal, such as platinum or a platinum rich alloy. The second layer is preferably silver and of approximately 300μ inches, or other metals which are electronically and thermally conductive. An outer layer of approximately 15μ inches of gold is also provided. Such a combination alloys well, and sinters to a substantially gas tight metal phase when heated. It is noted that in the event a plating technique is used, which may extend to the metal perimeter 12c, outside the area of the dimple pattern 52, a masking technique is also preferably employed to avoid interference of the electrical contact layer with welding or other mechanical connections formed between the cell components. Such masking may be accomplished using a conventional type chromate paint such as Super XP2000 Laquer available from Miccro Products.

The Frame and Cell Heat Element

The frame 54 of the cell 12, both the first and second members 56, 58, is preferably cut from an alumina forming alloy, for example, Alpha IV steel foil available from Allegheny-Ludlum. It should be understood that any metal foil which is temperature and oxidation resistant may be used, such as stainless steels, Fe based alloys, Ni based alloys, austentic, martensitic, ferritic and duplex, silver, silver alloys, superalloys and high nickel alloys. The foil has a thickness of approximately 0.008 inches. Several different overall cell configurations are currently used, as previously mentioned. In the illustrated embodiments the cell 12 has a rectangular configuration. The first and second frame members 56, 58, illustrated in FIGS. 13 and 14, respectively, are substantially opposite or reverse image in their configuration, but for the bridge portion, such that upon assembly they together form the supporting structure engaging the other components of the cell. In the event the photolithographic foil member 60', 60" is embossed with a portion 73, 73' for receiving the heat element, no additional frame members may be required. The members 56, 58 include alignment holes 68 at three of the frame corners for use in securing the cells 12 in the stacked configuration of the cell stack 13 within the thermal shell 24. Adjacent an edge 70 of the frame is a raised or embossed portion 72 for surrounding and encapsulating the cell heat element 62 within the cell. Like the embossment of the bipolar foil 50, the raised portion 72 of the first and second members of the frame are also embossed or cold formed. By embossing the raised portion, additional stiffness is added to the structure of the frame, without adding additional weight. Also, the embossment lessens any warping which may occur during welding. The ends of the cell heat element extend from the body portion as indicated in FIG. 16.

The arm 12b extends from the body 12a at the fourth corner of the cell 12. However, it should be understood that the arm may extend from the center of a side, or at another convenient location for obtaining the desired design cell characteristics. Each of the first and second frame members 56, 58 includes a cut out portion 74, such that the arms 12b of the frame members extend in the same configuration as the cell arm, but without material within the center of the arm 12b. In the first frame member 56, the cut out portion 74 forms a slot 76, such that a bridge portion 78 is formed between the body 12a and the arm 12b of the frame member. In the second frame member 58, no such bridge portion is provided, such that the entire frame, both the body 12a and arm 12b portions, are open as shown.

Prior to use of the frame members and the embodiment of the cell heat element of FIG. 12, these members are cleaned and optionally fired to provide an alumina forming surface which provides an insulating coating and for material stress relief, since the material is more ductile following firing. In the FIG. 12 embodiment, the cell heat element is a 0.008 inch thick Alpha IV foil member, having a width of 0.400 inches. Each frame member and cell heat element is cleaned with ethanol or other appropriate cleaner. In the preferred embodiment, the frames are then arranged in the following repeating configuration: a setter plate, two same direction frames, and a layer of zirconia felt outlining the embossment. The frames and cell heat elements are then heated in a furnace as follows: increase 5° C. per minute up to 500° C., then up 3° C. per minute up to 900° C., then hold for 15 hours, then down 3° C. per minute to 500° C., then off.

An additional insulation layer is also applied to the cell heat element illustrated in FIG. 12. Following firing, the cell heat element is coated with a mixture of commercially available 571 cement, available from Cotronics, to which is added 25% by weight boron nitride (BN) paste. The paste is available from Advanced Ceramics Corp. The mixture is applied to both sides of the cell heat element, allowed to dry, followed by application of an additional layer. The elements are then heated in a drying oven for an hour at 200° C.

Additional cell heat elements may also be used in connection with the present device. For example, a conventional heating wire 62' may be used which is sheathed in woven ceramic electrical insulation material. The use of the wire embodiment is shown in FIG. 16. Still further, a thick film paste material system for planar heater applications of the type available from Ferro Corporation, Cleveland, Ohio, may also be used within the first and second frame members 56, 58 as a heat element 14, or directly on the bipolar foil and/or photolithographic member.

In a still further embodiment of the present device, as illustrated in FIGS. 1–2 and 12a–12b, a dual heat element 62''' arrangement is provided. Two heater strips 190, 191 are provided engaging the surface of each cell 12 parallel with the arm 12b are shown in FIG. 12c. Once the cells and heater strips are arranged in the cell stack 13, the adjacent ends of each heater strip are connected via a pinch weld or other connection, as shown in FIG. 12d. The top heater strip and bottom heater strip are then each welded with the power source, such at that current flows in an s-shaped pattern as shown in FIG. 12c, through the interconnected heater strips to heat the cell stack.

The Photolithographic Foil Member of the Cell

The photolithographic foil member 60 is preferably manufactured of an alumina forming alloy such as Alpha IV or Haynes International's H-214 alloy, but may be another suitable metal alloys, such as stainless steels, Fe based alloys, Ni based alloys, austentic, martensitic, ferritic and duplex, silver, silver alloys, superalloys and high nickel alloys. The foil member 60 is preferably approximately 0.002 or 0.004 inches thick. As illustrated in FIGS. 9 and 10, the member has outside dimensions of approximately 6 inches by 9 inches. A honeycomb hole pattern, or hexagonal close packed hole pattern section 80 or the "active area" of the member, is provided within the member 60, and has dimensions of approximately 5 inches by 7.8 inches. The use of the honeycomb hole pattern 80, which has no sharp corners, and is rounded at the corners, avoids stress concentrations in the metal member 60, which may later result in cracking of the ceramic composite material 61 which is the combination of the ceramic material CM within the pattern 80 of the member 60. It should be understood that alternate hole and hole pattern configurations may be used, such as the use of ovals, or bars with rounded ends. However, such designs should avoid the use of sharp corners to reduce stress.

The size of the hole pattern section 80 results in a metal perimeter 12c which allows for sufficient mechanical deflection of the member 60 without resulting in stressing of the ceramic material which is eventually provided within the holes of the hole pattern section 80. Best results from the device 10 of the present invention are believed obtained when small, close packed holes are used, to provide good electrolytic characteristics within the cell, together with thin but strong and supportive interconnections between the holes, to give the cell good mechanical properties.

Additionally, welding and additional interface requirements related to the member 60 may be performed at the metal perimeter 12c.

The hole pattern in the hole pattern section 80 is created within the metal member 60 using conventional metal photolithographic techniques. At the center of the pattern, a hole size and arrangement is provided as illustrated, which is approximately 0.0375 inches between the centers of the holes along the long side of the member, and approximately 0.0325 inches between the centers of the holes along the short side of the member. The large hole size is approximately 0.033 inches in diameter. At the edges of the hole pattern, the sizes of the holes may be reduced, or feathered from large to small. The first size reduction is to approximately 0.025 inches diameter, and the smallest sized hole is approximately 0.016 inches diameter. Alternate feathered patterns may also be used. An oxygen egress arm 82, comparable to the arms 12b provided in the other cell components, is provided on one of the short sides of the member 60. Still further, tabs 84 are provided along one side of the photolithographic member 60 for suspending the member into a tank containing the desired ceramic material to be applied to the member, or dipping the member. Following the dipping process, the tabs 84 are removed by conventional cutting techniques.

The alternate embodiment of the photolithographic foil member 60' illustrated in FIG. 16, includes an embossment 73 which is spaced from and surrounding the hole pattern section or active area 80'. The embossment 73 has a partial cylindrical configuration, and is arranged to support and engage the embodiment of the cell heat element 62' which is the wire within the woven sheath. In this alternate embodiment, alternate frame members must also be provided having an embossed portion 72 which corresponds to the shape of the member 60' for engagement of the frame 54 therewith. Still further, the member 60' may be used with only a single frame member positioned on a side to encase the cell heat element 62' within the embossment 873, or with no frame at all, since the bipolar foil 50 could also be used to secure the wire cell heat element 62' within the member 60'. It should be understood that, depending on the design selected, the cell 12 need not include either a frame or a heat element. Although they may be useful, where it is desired to minimize weight considerations, designs eliminating these components are desirable.

Each of the frame, bipolar foil and photolithographic members 54, 50 and 60 additionally include alignment holes 86 for alignment of the members during further assembly of the cells 12.

Figure 16A:
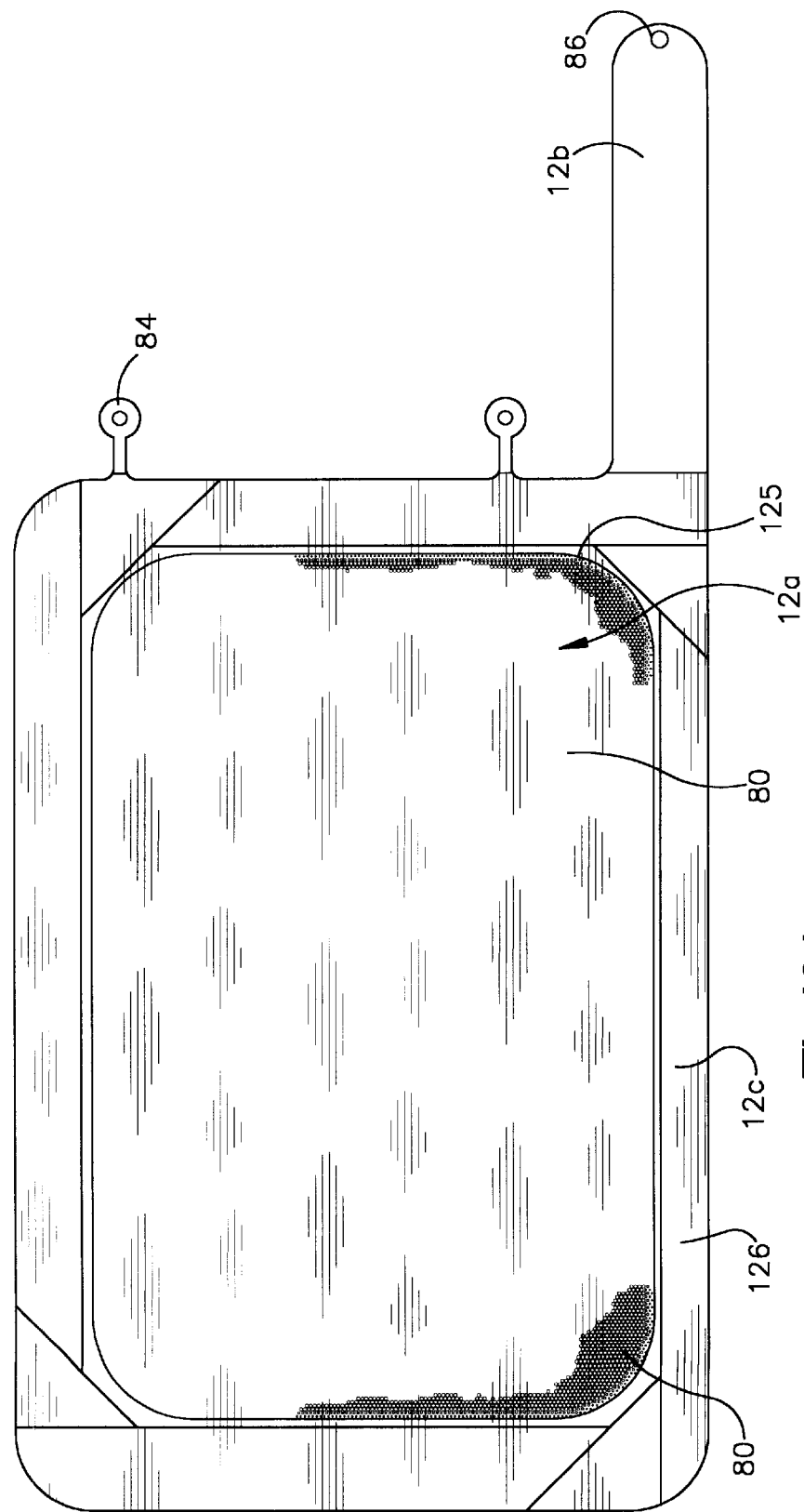
FIG. 16a is a schematic, top plan view of an alternate embodiment of the photolithographic foil member of the ceramic composite cell.

Once the photolithographic member 60 is cleaned by detergent washing and rinsing, followed by isopropanol washing and drying, the member is masked to prevent coating of certain sections of the member with the desired ceramic material. Any masking material desired may be used. In one embodiment, a polyimide tape 125 with silicone adhesive is used. However, it should be understood that alternate tapes, such as Scotch® brand tape as illustrated in FIG. 16a, may also be used. In the event such commercially available tapes are used, it is preferred to additionally include a further layer of refractory ceramic coating 126, such as 20% solids zirconia, alumina or mullite, containing a small amount of polymer. The polymer used is a solution preferably containing nitrocellulose or "guncotton," of the type commercially available in fingernail hardener and thickeners. This layer of tape 125 and refractory ceramic coating including the polymer 126 keeps the coatings applied to the member 60 during dipping from contacting the metal perimeter 12c. Additionally, if 0.002 inch foil is used, a metal support or splint can be taped to the metal perimeter 12c to provide additional mechanical integrity during the dipping process.

Application of the Ceramic Material

The ceramic material interconnected with and supported by the hole pattern 80 of the photolithographic member 60 is as follows: a first base coat is of bismuth baria $(Bi_2O_3)_{0.80}(BaO)_{0.20}$, which is a coarse grind slurry or slip with a large particle size (1 to 1+ microns) and a viscosity in the 10,000 to 90,000 centipoise measured range, preferably in the 20,000 to 50,000 centipoise range, and especially preferably in the 29,000 to 32,000 centipoise range, using a Brookfield viscometer on spindle #4 at 3 rpm. The second coat is a slip of bismuth calcia baria $(Bi_2O_3)_{0.8}(CaO)_{0.175}(BaO)_{0.025}$ having a smaller or fine particle size, relative to the first coat applied. The third layer is also a fine or small particle size slip of bismuth baria $(Bi_2O_3)_{0.80}(BaO)_{0.20}$. The fine layers have a particle size principally in the range of 0.1 to 1 microns, with some particles up to about 30 microns.

The slips are applied by dipping of the photolithographic member 60 into the slurry mixture. After dipping into the first base coat, the coated member 60 is fired to 650° C. in air at 1° per minute to 350° C. for 10 minutes and 2° per minute to 650° C. for 30 minutes. Following each of the second and third dippings, the member 60 is fired to 650° C. at 10 per minute to 350° C. for 10 minutes and 2° per minute to 650° C. for 200–210 minutes. The slips or slurry mixtures of each of the coatings must be sufficiently viscous so that they don't drain off of the member during vertical drying and horizontal firing. A desired viscosity of the base coat is believed to be approximately 30,000 centipoise using a Brookfield viscometer on spindle #4 at 3 rpm. The first base coat is found to be fairly conductive, with a melting point of 740° C., while the second thinner layer of bismuth calcia baria is more refractory, melting point 840° C., and less conductive. The thinner seal coat layers sinter very readily to form a gas tight seal. The present invention provides superior flow of ions through the cell using both these large and small particle size coatings to obtain optimal performance, since the first thin bismuth calcia baria layer keeps localized hot spots from melting through and short-circuiting when the device is operated at high power levels.

Manufacture of The Ceramic Material

The ceramic material preferably used to engage the member 60 comprises a bismuth baria mixture. To make the powder used to manufacture the ceramic slurries or dips, several steps are required. The overall goal is to produce a powder with a ratio of 80 mole percent bismuth oxide to 20 mole percent barium oxide $(Bi_2O_3)_{0.80}(BaO)_{0.20}$. There are four conventional ingredients:

1200 g $Bi_2O_3$ 167.7 g $Ba(NO_3)_2$ 500 g distilled water 300 g ethyl alcohol 1000 g of ethanol may also be used as an alternative to the water and alcohol.

The barium is a free-flowing powdered nitrate, which is soluble in water. This nitrate converts to oxide during the first firing of the powder as discussed below. The barium is first dissolved in the distilled water, which is accomplished by heating the water to nearly boiling until it is completely dissolved. The bismuth oxide powder, also free flowing, is placed in a 4000 ml Nalgene polyethylene jar. The jar also contains 5 kg of 10 mm sphere Tosoh zirconia grinding media. The ethyl alcohol is then added to the jar, and the jar is placed on the roller mill for 5 minutes to wet the bismuth oxide powder with the alcohol. The barium nitrate solution is then added to the jar, and the contents is cooled for 30 minutes. The jar is then placed back on the roller mill for 16 hours at 60–65 rpm.

Following the first roll milling step, the slurry mixture is poured into trays covered with polyethylene sheets, and spread evenly over the sheets to a 1 cm or less thickness. The slurry is allowed to dry in a Thermolyne convection oven for 4 hours at 68° C., or until the water and alcohol have evaporated.

The dried powder is then put through a U.S. standard 20 mesh stainless steel sieve. The powder is then fired to promote the desired solid-state chemical reactions, including: the conversion of barium nitrate to barium oxide, and the formation of the bismuth barium oxide compound.

During the first firing, which converts the barium nitrate, the 75 ml of powder is placed in alumina boats, which are 7 in. by 5.5 in. by 1.5 in., and is spread evenly on the bottom. Air is pumped into the furnace at 1 liter per minute during firing to ensure an oxidizing environment.

To promote homogeneity in the final powder, a second firing is preferably performed. The once fired powder, 2400 g, is placed in the grinding jar with 2 kg of 10 mm zirconia grinding media and 600 g of ethanol. The jar is placed onto the roller mill for a period of 40 hours to obtain a desired fine particle size. The slurry mixture is then poured into trays covered with polyethylene sheets, and spread evenly over the sheets to a 1 cm or less thickness. The slurry is allowed to dry in the oven at 68° C. for 20 minutes, or until the ethanol has evaporated. The firing sequence for the first firing is as follows: 3° C. per minute to 250° C. for 60 minutes; 5° C. per minute to 650° C. for 600 minutes; step down to room temperature.

During the second firing, 100 ml of powder is placed in alumina boats which is spread evenly on the bottom. Air is pumped in to the furnace during firing at 1 liter per minute to ensure an oxidizing environment. The second firing sequence is as follows: 3° C. per minute to 250° C. for 60 minutes; 5° C. per minute to 710° C. for 600 minutes; step down to room temperature.

To mix the slurries in preparation for application to the member 60, the twice rolled and fired powders are first dry milled. The powder is placed in a jar with 3 kg of grinding media and placed on the roller mill until the desired particle size is obtained and the powder passes through a U.S. standard 70 mesh sieve, but not through a 200 mesh sieve.

The base coat powder is then prepared as follows: 1600 g zirconia grinding media is added to an attritor tank of a conventional attritor, such as a Union Process attritor, Akron, Ohio. Water at 85° F. is pumped through the tank for cooling purposes. The following components are then added to the attritor tank: 80 g of solvent, and 20 g of dispersant such as a 3 to 1 mixture of W930 and W910 from Witco Corporation. The solvent may be a combination such as 30 g Hexanol, 30 g Nonane, 10 g Decanol and 10 g Hexadecane. The attritor is then operated at 300 rpm, followed by the addition of: 960 g $(Bi_2O_3)_{0.80}(BaO)_{0.20}$, which is milled for 15 minutes, 120 g $(Bi_2O_3)_{0.80}(BaO)_{0.20}$, which is milled for 10 minutes, 60 g $(Bi_2O_3)_{0.80}(BaO)_{0.20}$, which is milled for 5 minutes, and 60 g $(Bi_2O_3)_{0.80}(BaO)_{0.20}$, which is milled for 30 minutes. A viscosity reading is then taken after 1 hour total milling time to determine if the desired level has been obtained.

Following attritting to the desired viscosity, 60 g of a solution of conventional elastic polymer or polymers is added to the slurry, which is milled at 300 rpm for 1 minute. The polymer solution is used to provide bending strength in the photolithographic member prior to the firing. The mixture is then milled at 100 rpm for 1 hour. Following attritting, the slurry is then placed on a conventional roller mill for 18–24 hours.

The seal coat powders of 1) bismuth baria oxide and 2) bismuth calcia oxide are then prepared. For either of these slurries or slips, the following ingredients listed are first added to each: 1600 g of 5 mm zirconia grinding media; 163.3 g of solvent such as Decanol; and 5 g of dispersant such as W930 available from Witco. Water at 85° F. is then pumped through the attritor. The attritor is then operated at 500 rpm and for the bismuth baria oxide slip, 1200 g of $(Bi_2O_3)_{0.80}(BaO)_{0.20}$ having passed through a 200 U.S. mesh sieve, is added, or for the bismuth calcia oxide slip, 1200 g of $(Bi_2O_3)_{0.8}(CaO)_{0.175}(BaO)_{0.025}$ having passed through a 300 U.S. mesh sieve, is added. The slips may then be milled for baria for 96 hours, or for calcia for 120 hours. Following attritting additional solvent is added to each, 115 g Decanol, as well as dispersant, 15 g Sandopan MA-18, available from Clariant Corp., and 36 g of an elastic polymer, or 2% by weight of the powder, are also added, and the slips are mixed for 1 minute at 300 rpm. The slips are then placed on the roller mill at least overnight. The seal coat slips are preferably reduced to 65% solids by diluting with additional solvent such Hexanol.

Figure 17:
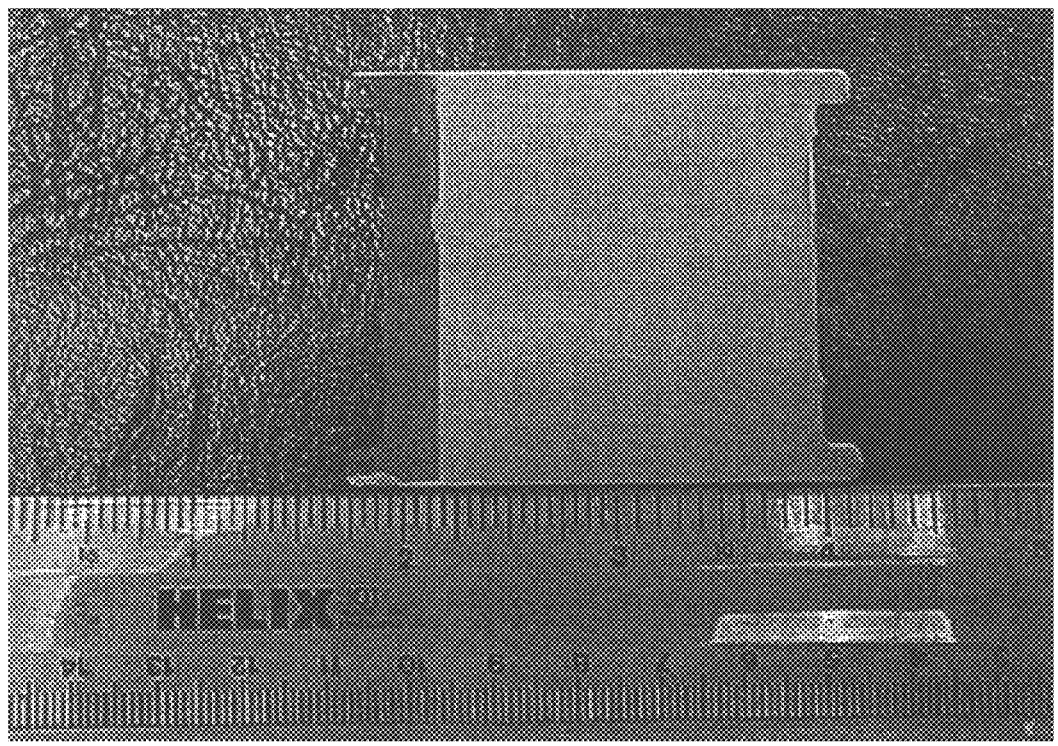
FIGS. 17 and 18 are a photograph of a fired "A8" base coat test sample, and a graph of the particle size of the "A10" base coat medium tested, respectively.
Figure 18:
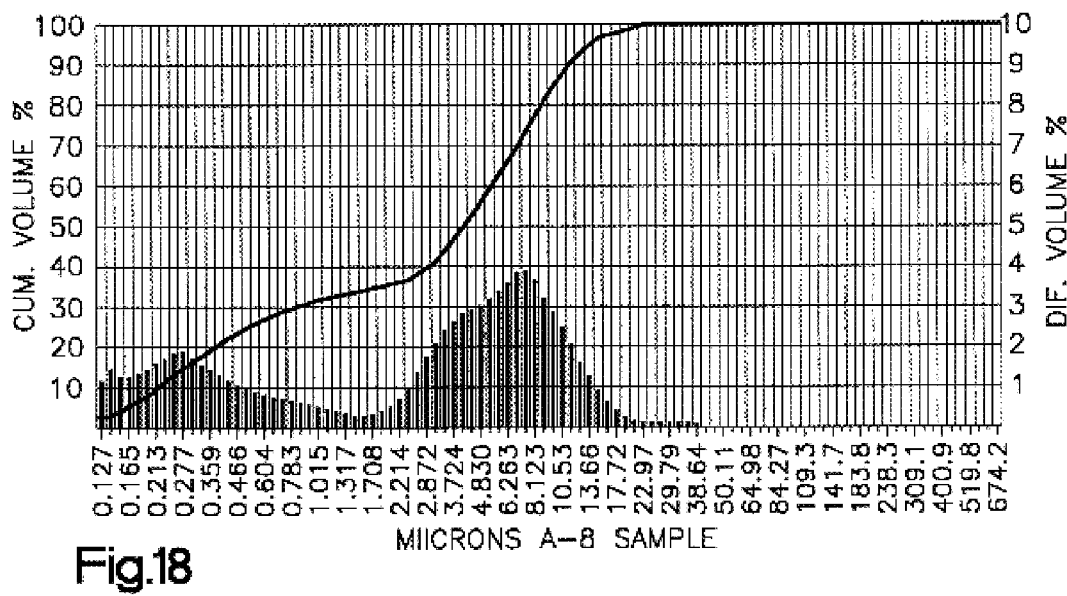
Figure 19:
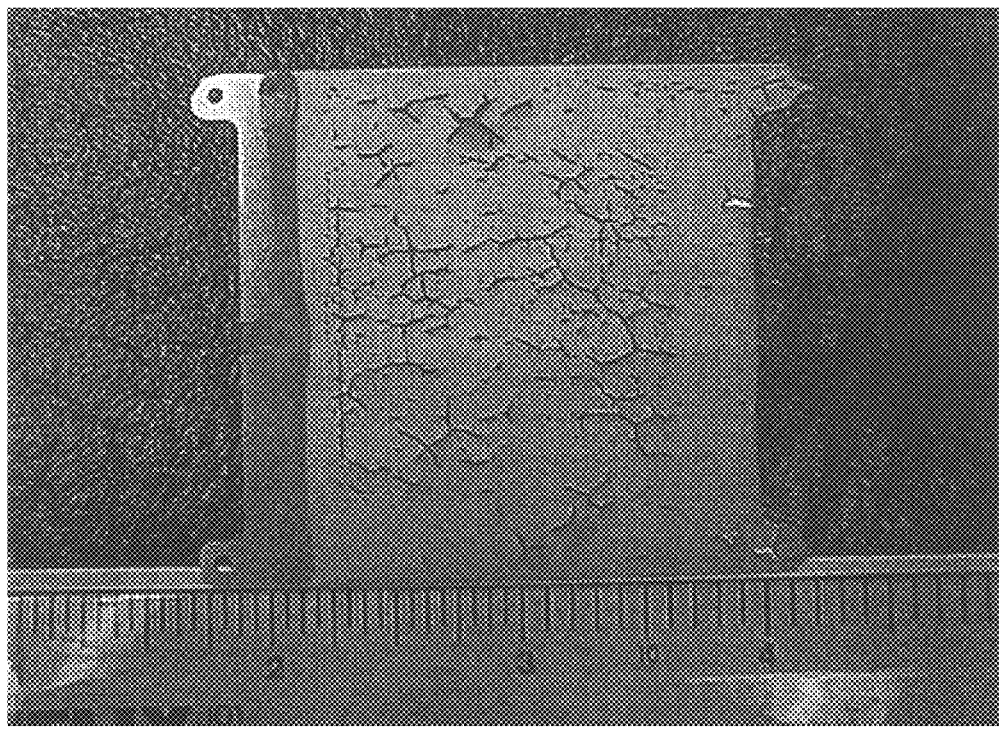
FIGS. 19 and 20 are a photograph of a fired "A10" base coat test sample, and a graph of the particle size of the "A10" base coat medium tested, respectively.
Figure 20:
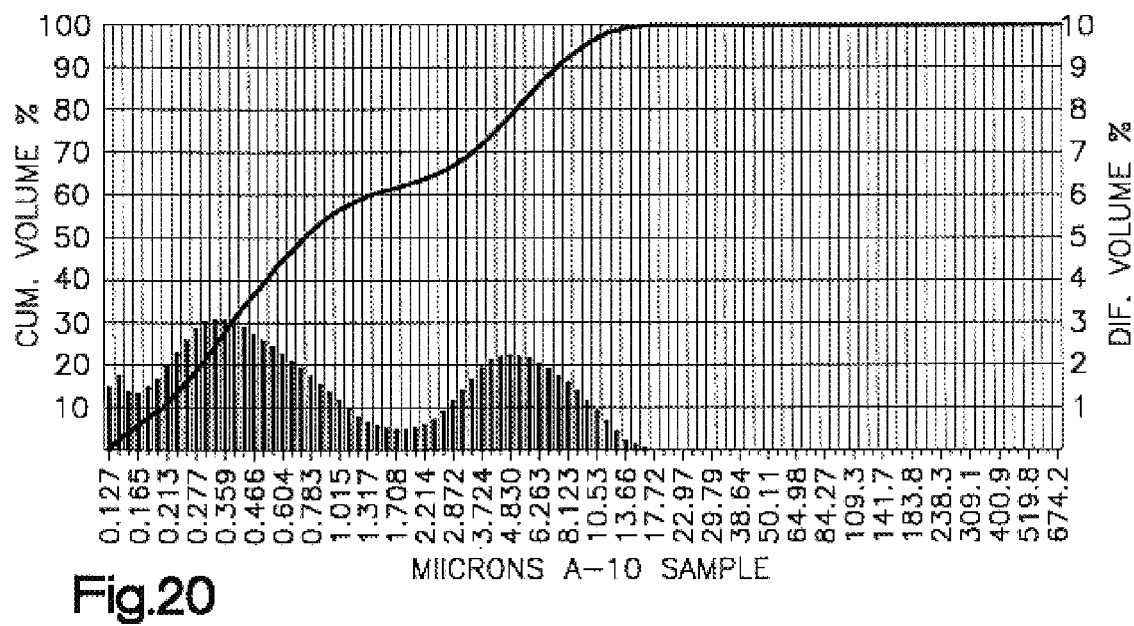
Figure 21:
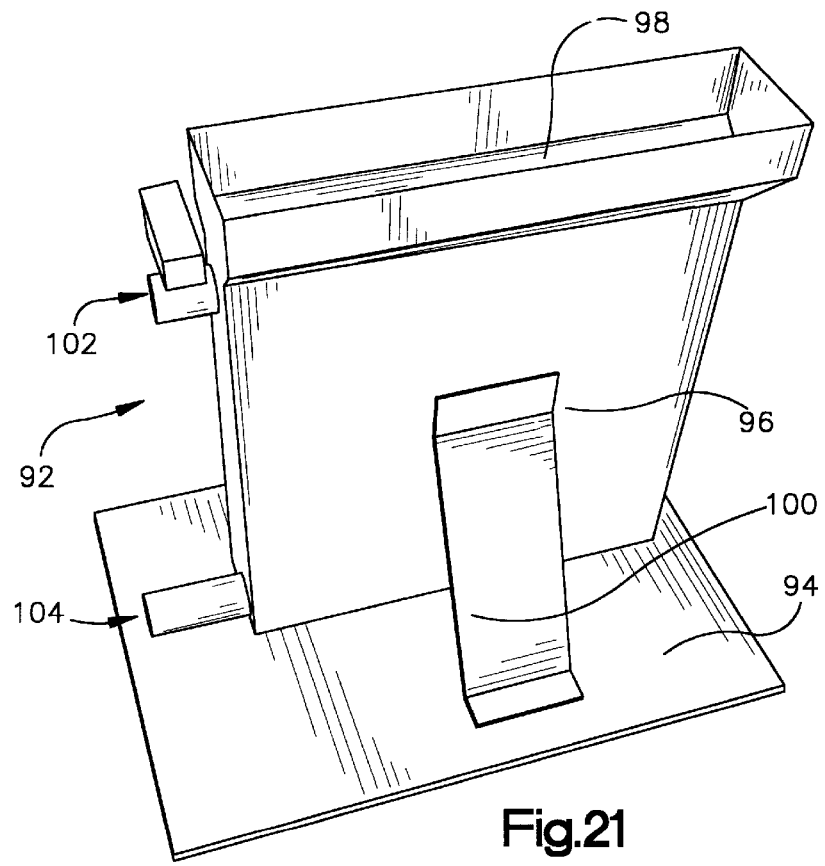
FIG. 21 is a perspective view of the dip tank of the dipping system used to contain the ceramic slip materials for the ceramic composite cell.

Two samples showing tests of base coat applications following firing are illustrated in FIGS. 17 and 19. The formulation of the test sample A8 was identical to test sample A10, but for particle size. FIGS. 18 and 20 are graphs illustrating the difference in particle size referenced for test samples A8 and A10, respectively. As is readily seen, the A8 test sample in FIG. 17 containing larger particle sizes achieved excellent results, since the slurries are well sealed to the photolithographic member following firing, while the smaller particle sizes of the A10 test sample in FIG. 19 were not satisfactory.

In a second example of a ceramic material, a first base coat is dipped and dried, and a second seal coat is dipped and dried, followed by only a single firing of the two coats. The base coat comprises the bismuth baria oxide. The seal coat comprises bismuth calcia baria.

The Dipping Process and the Dip System

By applying the base and seal coat slurries using a dipping process, a better and structurally stronger ceramic composite material is believed obtained. Additionally, the resulting product is easier to reliably manufacture. Although spraying, spinning, silk screening and painting techniques may all be used in the application of the slurries, the dip process is believed to provide more dense packing of the slurry particles, enabling more efficient ionic flow through the cell. Failure of the coatings to adhere also appears to be minimized using the dipping process. The dip process makes use of a dip system having a tank with an optionally circulating slurry or slip material so that the material is constantly agitated and does not have an opportunity to separate.

The dipping process of the present invention is now described. The cleaned photolithographic members 60 are dipped into a dip tank 92 of the type illustrated in FIG. 21 suspended from the tabs 84. The dip tank 92 is a stainless steel container approximately 11 inches tall, 7 inches long and ¼ inches wide. The tank includes a heavy base plate 94, a reservoir portion 96, a drip portion 98, and supports 100 interconnecting the base plate 94 and reservoir portion 96. An inlet 102 and outlet 104 are also provided for continuously supplying slurry material to the tank. The inlet and outlet 102, 104 are interconnected via Viton hose with a peristaltic pump 106, shown in FIG. 22. The pump 106 has a microprocessor controller 107, is manufactured by Cole Parmer, and is able to pump quite coarse slurry materials. The pump is in communication with a slurry supply tank 108 and material filters 110 forming a part of the pump 106 and the inlet 102, which supply the desired amount of filtered slurry to the tank.

The tank is first filled with slip or slurry material, at least to the inlet 102, and a flow of material is started between the inlet 102 and outlet 104 using the pump 106. The member 60 is then submersed within the reservoir portion 96 via the drip portion 98. Once submersed the direction of the slurry flow may be reversed using the pump controller. Such flow changes enhance the coating of the member 60. Additionally, once the member 60 is coated, the flow direction may be reversed in order to remove any bubbles which may have formed. The member 60 remains within the base coat slurry for a minimum of 20 seconds. For the calcia seal coat slurry, the tank or dip retention time is approximately 3 minutes, and for the baria seal coat slurry the dip retention tip is approximately 30 seconds. When the member 60 is removed, care should be given not to bump the sides of the tank. The coated members 60 are then hung via conventional hangers from the tabs 84 on a drying rack for a minimum of 30 minutes. The drying rack is then moved to a forced air drying oven, such as the Thermolyne 9000 oven, for drying of the base coat slip at approximately 1° C. per minute to 30° C. for 30 minutes followed by 1° C. per minute to 60° C. for 60 minutes. Drying of the seal coat slips is identical to the base coat process. Once the ceramic material is dried, the member 60 is removed from the rack and the sintering or firing processes discussed above may be commenced.

Following the application of the desired ceramic material to the hole pattern section 80, an edge 88 of the ceramic material which has just been applied is coated with a thin layer 90 of the ceramic material, but having a consistency of approximately 50% solids. This treatment results in a tight bond of the edge 88 of the ceramic material to the member 60 and avoids spontaneous release of the ceramic from the edges.

Application of Electrode Layers

Figure 22:
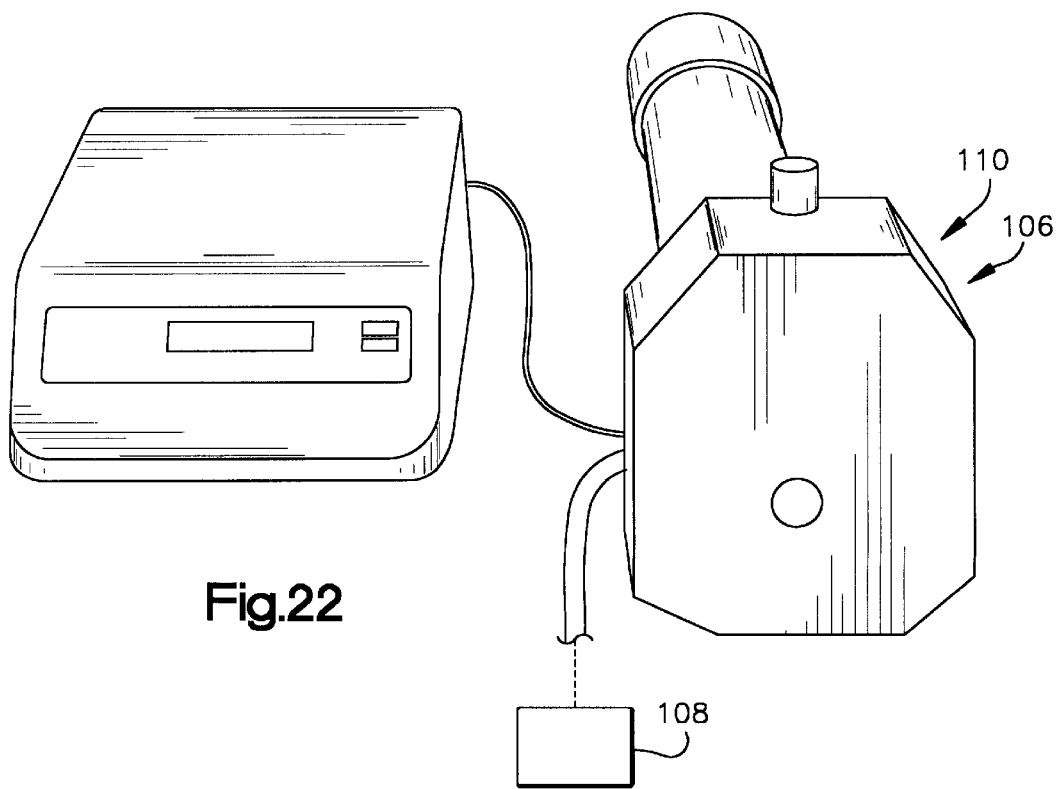
FIG. 22 is a perspective view of the computer controlled pump of the dipping system used to contain the ceramic slip materials for the ceramic composite cell.
Figures 23, 24:
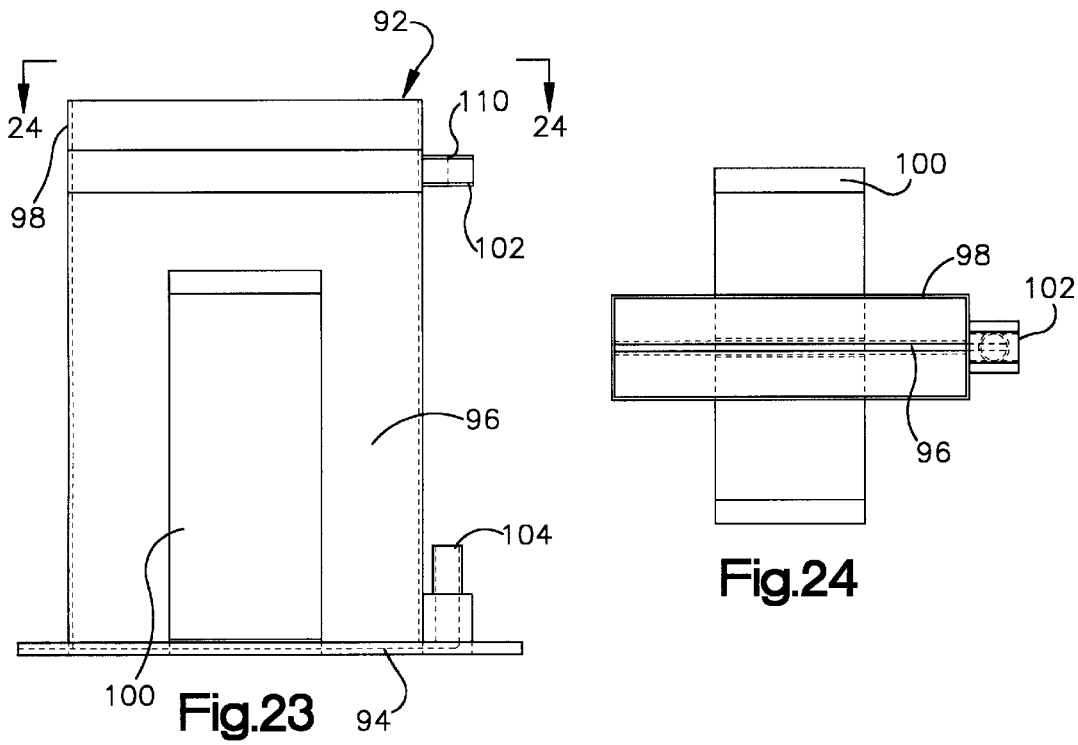
FIG. 23 is a schematic, side view of the dip tank of FIG. 21.
FIG. 24 is a partial, top plan view of the dip tank taken along the line 24—24 of FIG. 23.

Following the dipping and firing of the base and seal coats, electrode layers 112 are applied. The electrode layers 112, shown in FIG. 22 provided are in electrical communication with the dimples of the same cell 12 and an adjacent cell 12. The electrode layers, or cermet, are preferably approximately 50% porous, with the remainder composed of principally silver particles. The cermet also contains 10% by weight of the calcia powder having about a 300 mesh particle size, bismuth calcia baria $(Bi_2O_3)_{0.8}(CaO)_{0.175}(BaO)_{0.025}$, and ⅓% by weight of an ink, which serves as a catalyst, and which is 6% iridium. In the electrode layers, the silver provides very high thermal and electrical conductivity, which is balanced with the calcia seal coat slip particles, which is relatively refractory to keep the silver from sintering into a low porosity layer, having its melting point about 100° C. higher than the bismuth baria oxide solid electrolyte. Two coats of the cermet are applied by painting each side of the member 60. Each coating is fired at 625° C. for 30 minutes.

Figure 25:
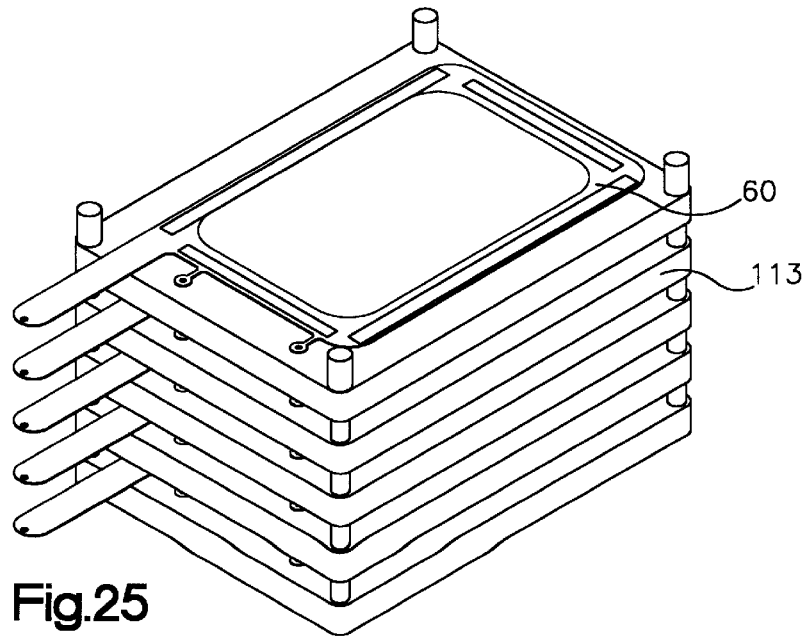
FIG. 25 is a perspective view of the photolithographic foil members arranged for firing following the application of a coating of ceramic material.

During each of the firing steps discussed above, the coated and dried member 60 is laid onto a setter plate 113. The setter plate 113 is preferably an 11.5 inch by 8 inch by ½ inch porous aluminum oxide, 10 ppi, of the type manufactured by Selee Corporation of Hendersonville, N.C. The plate is preferably ground flat on both sides and has adequate porosity to allow oxygen access to the member 60 during firing. The setter plate 113 with supported member 60, may be stacked up to eight (8) deep in the furnace with one-inch alumina spacers between the setter plates as illustrated in FIG. 25. Such setter plate 113 arrangements may have additional air flow capabilities, such as an adjacent air compressor for providing air across the member 60 at a rate of up to 5 liters per minute. Such air flow may be required, depending on the arrangement, to remove carbon and carbon containing materials within the furnace, without carburizing or reducing the metal or ceramic of the member 60. The air flow assist would typically be turned off at 50°–100° C. below the maximum furnace temperature, in order to maintain even temperatures within the furnace during the final high temperature portion of the firing cycle.

Figure 26:
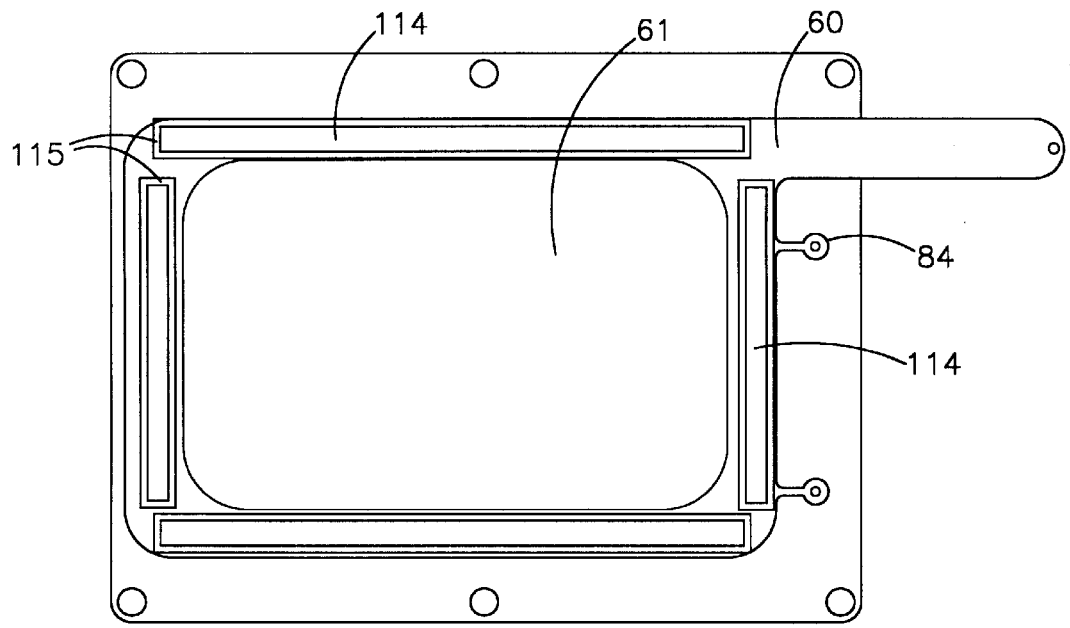
FIG. 26 is a top plan view of a photolithographic foil member arranged for firing following the application of a coating of ceramic material, and with weights surrounding the metal perimeter.

Flatness is also useful to the operation of the cell 12, as well as with cell handling, and thus to the firing process. In order to assist with maintaining the flat configuration of the photolithographic members 60, small Haynes 214 or alumina weights 114 are evenly placed along the edges of the metal perimeter 12c as illustrated in FIG. 26. Where Haynes 214 weights 114 are used, an additional layer of zirconia felt 115, available from Zircar Corp., is used intermediate the weight and the metal perimeter 12c. The use of the felt 115 eliminates corrosion or staining problems which may occur during firing or as a result of firing. Additionally, a black-body thermal homogenizer 114, such as an open top container of Alpha IV metal alloy, may also be used to assist with elimination of the shrinkage and warp which occurs during sintering. The homogenizer 114 assists with elimination of differential temperatures across the member 60 during firing. A sheet of insulating material may also be used inside the opening of the furnace to "plug" the opening, and thus assist with reducing the thermal gradient.

Assembly of the Ceramic Composite Cell

Once the coating and firing of the photolithographic member 60 is completed, the components of the cell may be combined together in the following arrangement: first frame member 56 having a bridge, the photolithographic member 60, the bipolar foil 50, a cell heat element 62, and the second frame member 58 without a bridge. The components are aligned using the alignment holes 86 in each of the components. Alternatively, the cell design may be such that no frame is required, or that only one frame member is used, as illustrated in the embodiment of FIG. 15.

Once aligned, the components are interconnected via a $CO_2$ laser weld 118 to form a gas tight seal between the welded component layers, including the bipolar foil 50 and the photolithographic member 60 supporting the ceramic material as described and as illustrated in FIGS. 4, 5 and 15. The continuous weld 118 is located in the metal perimeter 12c inwardly of the embossed or raised portion of the frame 72, which secures the cell heat element 62 within the raised portion, as well as providing the hermetic seal or container for collecting the oxygen generated from the cell 12. An additional weld 120, which may be a non-continuous stitch weld, extends along the edge of the frame 70, including adjacent the cut out portion 74. It should be understood that the metal to metal seals indicated are preferably $CO_2$ laser welded, however, numerous alternate techniques may be used, such as other welding, brazing, soldering, crimping or bonding techniques. The weld must provide a hermetic and permanent gas tight seal for efficient operation of the cell.

Once the welding of the cell components is complete, the cell 12 is fired to 600° C. for at least four (4) hours, starting at 100° C., and increasing 5° C. per minute.

Assembly of the Oxygen Generating Device

Figure 3:
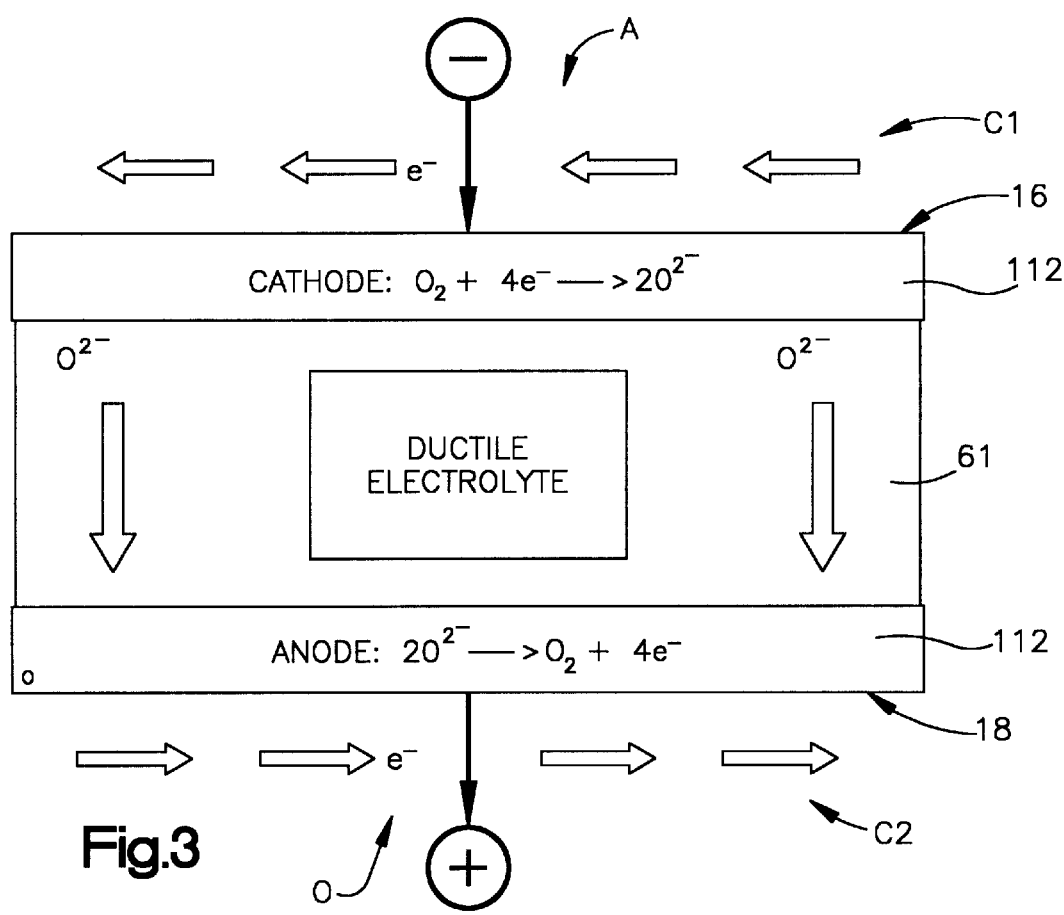
FIG. 3 is a schematic representation of a ceramic composite cell of the device showing the flow of electron exchange through the device during operation.

Once manufactured, between 10–20 cells 12, and 18 in the preferred embodiment, are aligned using the frame alignment holes 68 into a stacked arrangement. Each of the stacked cells has an anode side and a cathode side as previously described, and forms layers of gas plenum chambers positioned on alternate sides of each cell 12 within the device 10. Ambient air is fed to the cathode 16 of the cell 12 via an air plenum chamber C1, and oxygen is generated at the anode 18 as illustrated in FIG. 3. The air plenum chamber C1 is approximately 0.025 to 0.075 inches thick, with the cell 12 having an overall thickness of approximately 0.050 to 0.200 inches.

The electrical flow illustrated in FIG. 3 is provided by the power source 34, which provides electrical flow in the direction of the vertical arrow. As previously discussed, once stacked, the cells 12 are electrically connected via the electrical contact layers 53 on the dimples 64, 66 of the bipolar foil 50, and the electrode layer or cermet 112 on both sides of the ceramic composite material of the photolithographic foil member 60. Thus, in the illustration of FIG. 3, the cathode 16 supported on the member 60, contacts the contact layers 53 of the large dimples 64 of the bipolar foil 50 of an adjacent cell 12. Incoming air flows in the air plenum C1 intermediate the cathode 16 and the adjacent cell. The anode 18, supported on an opposite side of the member 60 from the cathode 16, contacts the contact layers 53 of the small dimples 66 of the bipolar foil 50 of the same cell 12. The anode 18 side of the ceramic composite material 61 and the small dimple side of the same cell form the gas tight oxygen plenum or chamber C2 where the oxygen is generated as indicated. In a design of the type discussed, about 50 amps flows through an active area of the ceramic composite material of about 250 $cm^2$, and results in a total voltage drop of about 0.250–0.500 volts. Since the ohmic drop across the electrical contact layers 53 is measured in milliohms, it is important to reduce any relatively electrically resistive oxide formation on the Inconel material of the bipolar foil 50. Additionally, it is noted that the preferred embodiment of the present device 10 experiences pressure drops between the cells 12 during operation. The pressure drops occur along the air plenum C1 and the oxygen plenum C2. As a result, an approximately inverse cubic relationship exists between the pressure drop and the flow rates, such that the large dimples 64 and the small dimples 66 of the bipolar foil member are sized according to this relationship.

Figure 31:
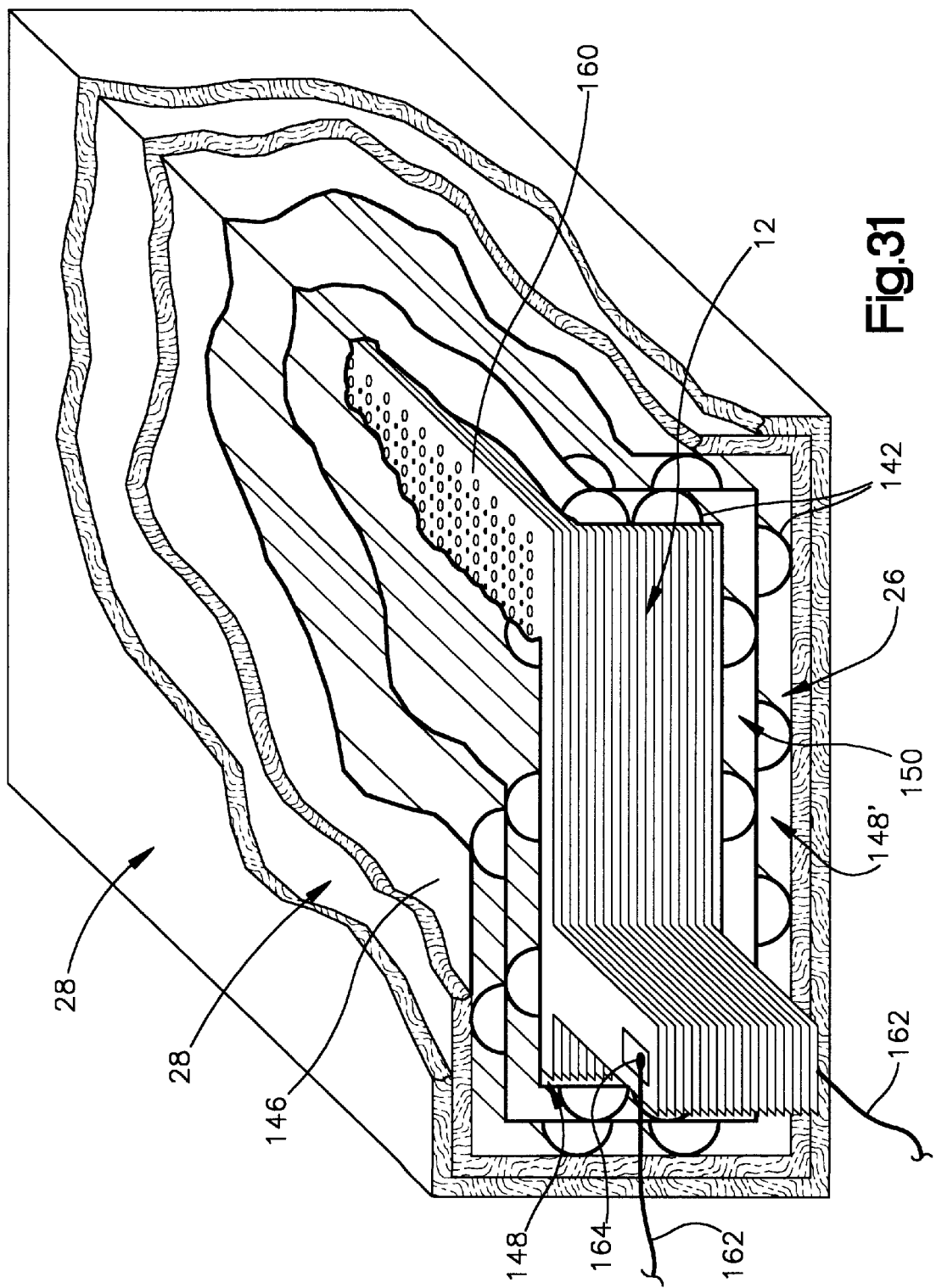
FIG. 31 is a partial, schematic, cut-away view of the cell stack and thermal shell of the device.

To connect the cells to the power source 34, a thin layer, nominally $\frac{1}{16}$ inch, of silver 160, which preferably has the configuration and at least one dimension of the dimple pattern 52 of the bipolar foil 50, is provided on the top and bottom of the cell stack 13. The use of at least one dimple toward the adjacent cell permits the free flow of air and oxygen over the last cells in the stack. As shown in FIG. 31, the lead 162 to the power source is easily interconnected via the use of the cermet material used on the photolithographic member 60. The cermet 164 is applied and fired as previously set forth, to sinter bond the lead 162 and silver layer 160.

As previously discussed, each of the arms 12b of the cells 12 are trimmed at the ends to ensure proper oxygen egress is provided from the cells, in part via the oxygen egress tube 67, and the gas output passageway 22. Additionally, free access to the resistive heat elements 62, 62', 62" must be provided for interconnection with the power source. Each end of each arm 12b of each cell 12 is engaged within the gas manifold 20. It is noted that the arms 12b provide desired heat exchange for increased cooling during operation of the device 10.

Figure 2:
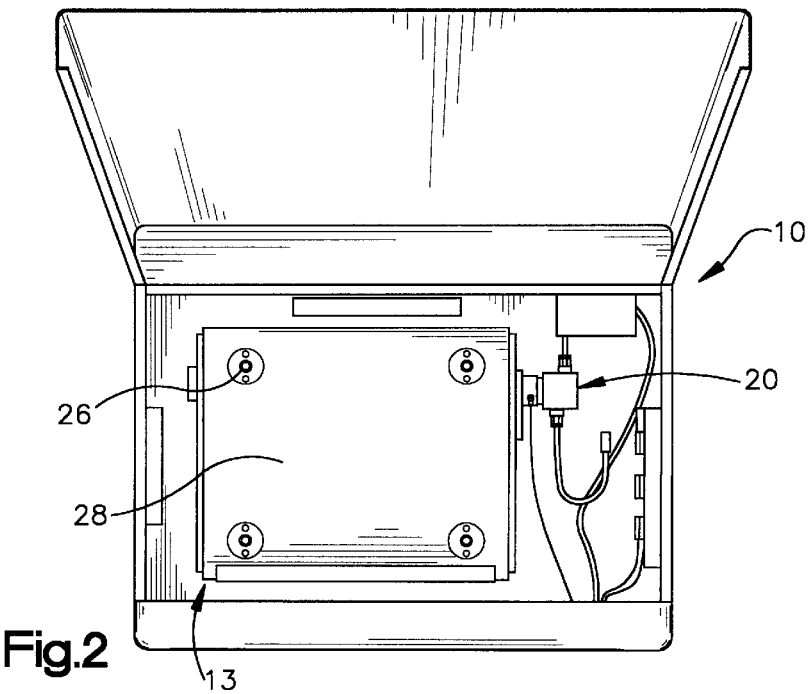
FIG. 2 is a partial top plan view of the oxygen generating device of FIG. 1.
Figure 27:
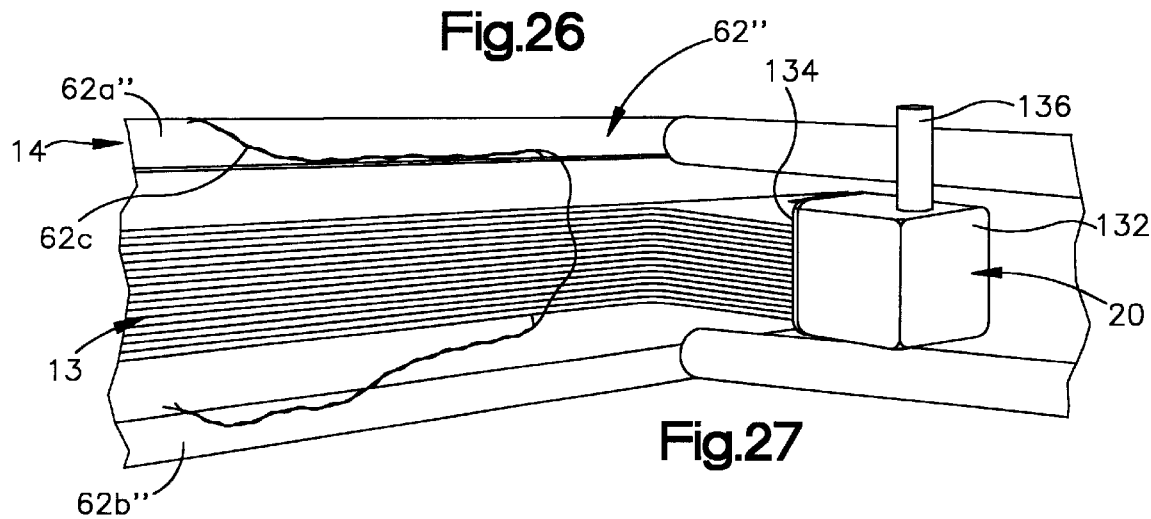
FIG. 27 is a partial, end view of a portion of the cell stack, gas manifold and heat element during assembly of the device of the present application.
Figure 28:
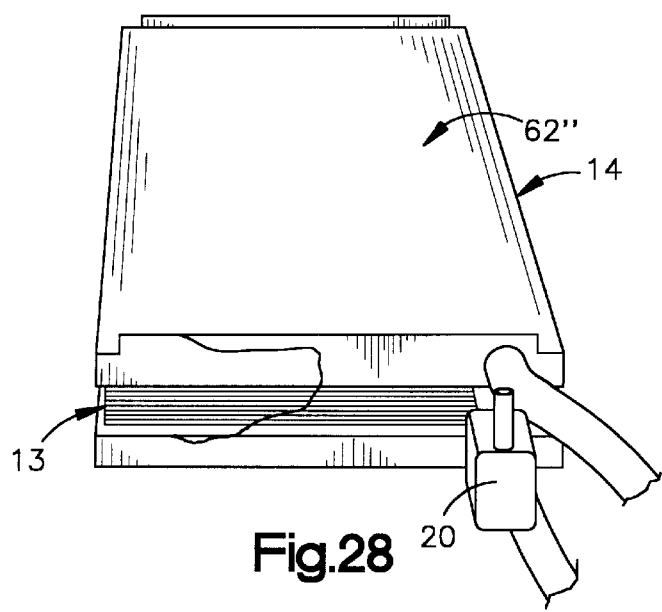
FIG. 28 is a partial, end view of a portion of the cell stack, gas manifold and heat element of the device of FIG. 27.

The gas manifold 20 of the present application is illustrated in FIGS. 27 and 28, and includes three (3) components, an inner slotted sleeve 130 having spaced members 131a forming slots 131b for receiving and engaging each of the cell 12 arms 12b, a manifold shell 132 for receiving the slotted sleeve 130 engaged with the cell arms 12b, and a silicone rubber RTV cover layer 134 as shown in FIG. 31, the for closing and sealing any open portions of the sleeve and shell to prevent the release of oxygen from the manifold other than through a shell outlet 136 provided in the manifold shell 132. The shell outlet also extends in part within the manifold shell forming a groove 137 which receives oxygen from the oxygen egress tubes 67 for supply to the shell outlet 136. The shell outlet 136 is sized to receive a standard ¼ inch tube fitting of the type which is provided directly to the oxygen output 44 for use of the device and oxygen by an operator. It is noted that an alternate embodiment of the gas manifold 20' is illustrated in the device of FIG. 2.

Figure 29:
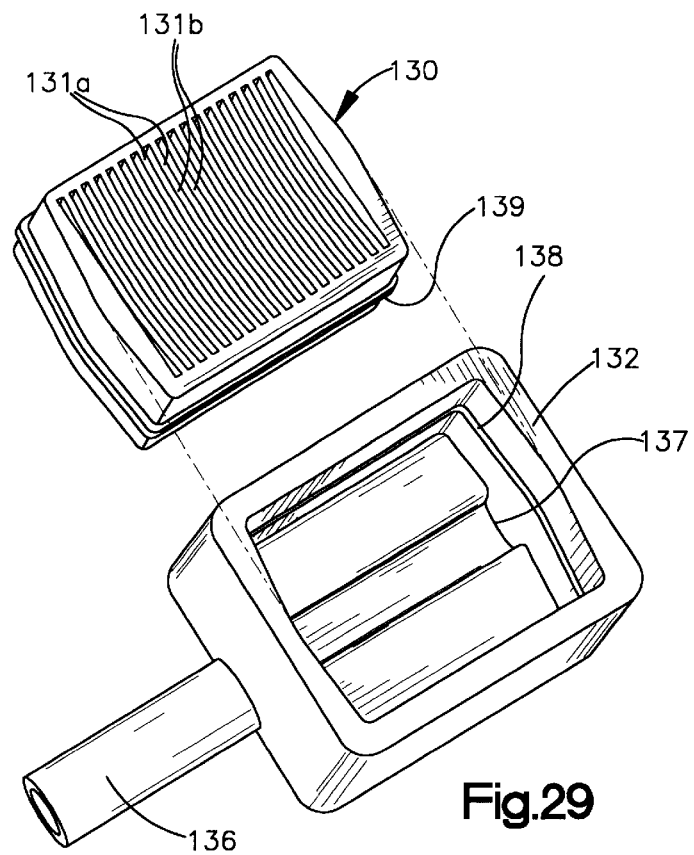
FIG. 29 is a top plan view of the components of the gas manifold of the device of the present application.

In the preferred embodiment illustrated, the gas manifold sleeve and shell components 130, 132, illustrated in FIG. 29, are manufactured of injection molded silicone rubber, and function as redundant o-rings. Each of the spaced members 131a is biased into engagement with the adjacent arm 12b, and the inner surface of the manifold shell 132 and outer surface of the slotted sleeve 130 include mating grooves 138 and ridges 139 respectively, for sealing engagement limiting oxygen flow to the shell outlet 136. The parts are coated with a silicone rubber RTV adhesive prior to being permanently snapped together, and applying the cover layer 134 for sealing the output passageways 22 of the cell arms 12b. The manifold 20 has temperature tolerances in the range of 250°–300° C. It is noted that more than one gas manifold may be used in an alternate embodiment to reduce the number of cells engaged with each manifold. Such an arrangement may be desired to provide engineering redundancy within the device 10, depending on the specific application desired.

Figure 30:
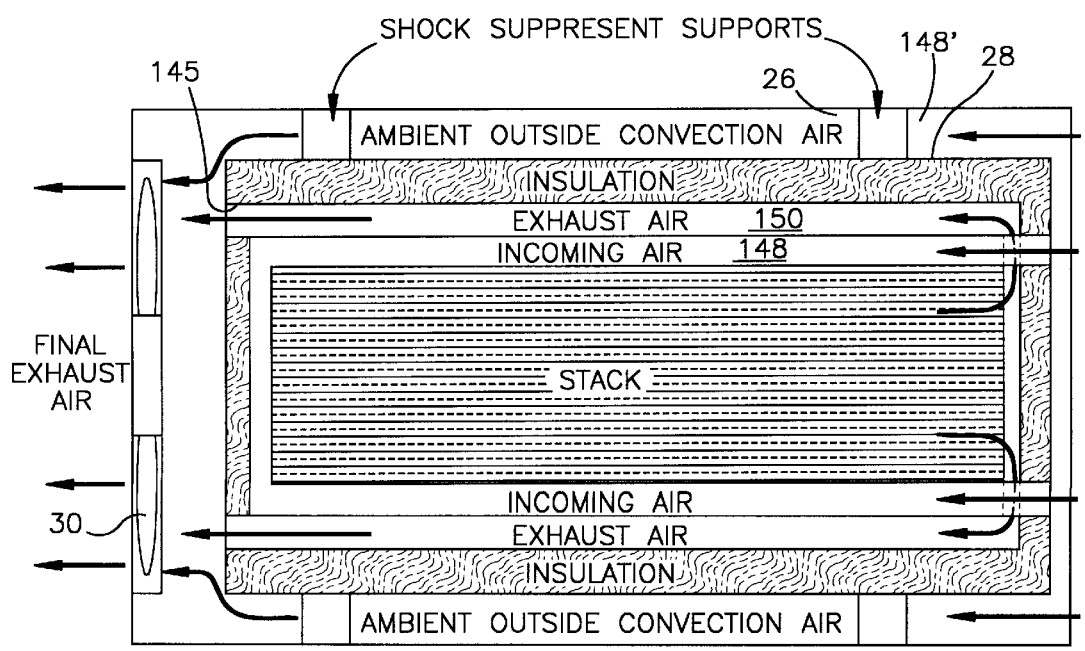
FIG. 30 is a schematic, cross-sectional diagram of the device showing air flow through the device during operation.

The stack of cells 12 is provided within the thermal shell 24, which has a co-flow, wrap around design for obtaining desired heat exchange, as illustrated in FIG. 30. In the thermal shell 24, the ceramic composite cells 12 are stacked in series surrounded first by an initial insulating material 28, which is preferably an alumina foam setter plate or a $\frac{1}{10}$ inch steel plate, as in FIGS. 27–28. In the embodiment of the device of FIGS. 27–28, the initial insulating material 28 is substantially surrounded by the heat element 14 which is two heating plates 62" having embedded resistance wires 62c available from Thermolyne. One plate 62a" is engaged on top of the initial insulation of the cell stack, the other is on the bottom. These heat elements 14" serve to heat the cell stack from the outside in, rather than heating each individual cell. Since successful operation of the device is dependent on maintaining temperatures within the cell stack in excess of 500° C., the use of an additional heat element 14" is dependent on the desired device output. Once the cell stack and insulating materials are assembled, they are inserted into the thermal shell 24.

Figures 32A, 32B:
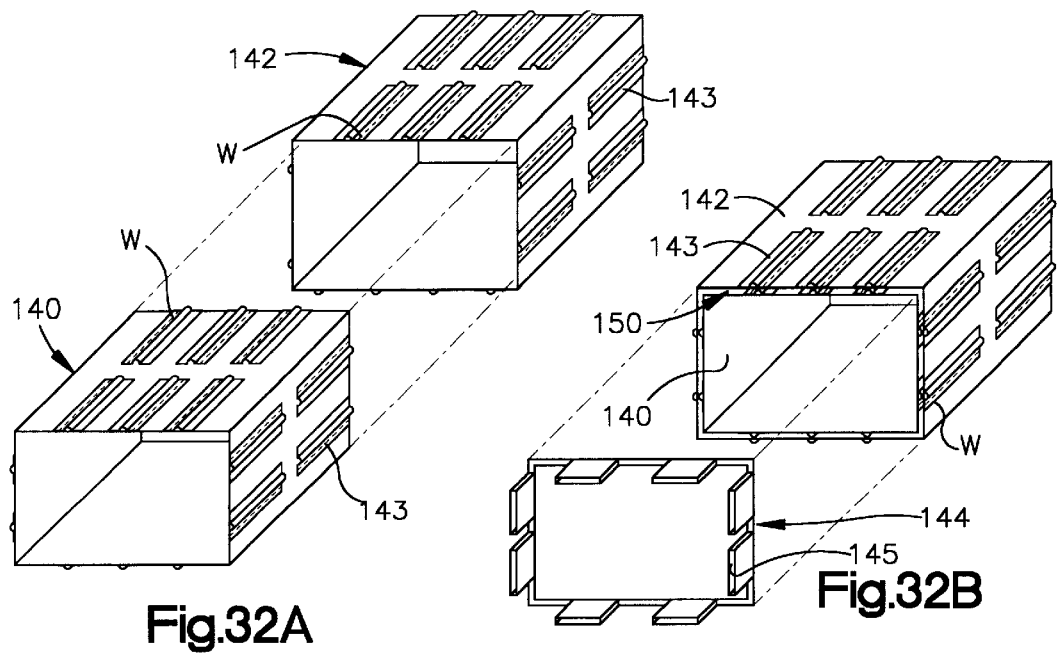
FIGS. 32A–32D are partial, schematic exploded views of steps A–D of assembly of the thermal shell of the device.
Figures 32C, 32D:
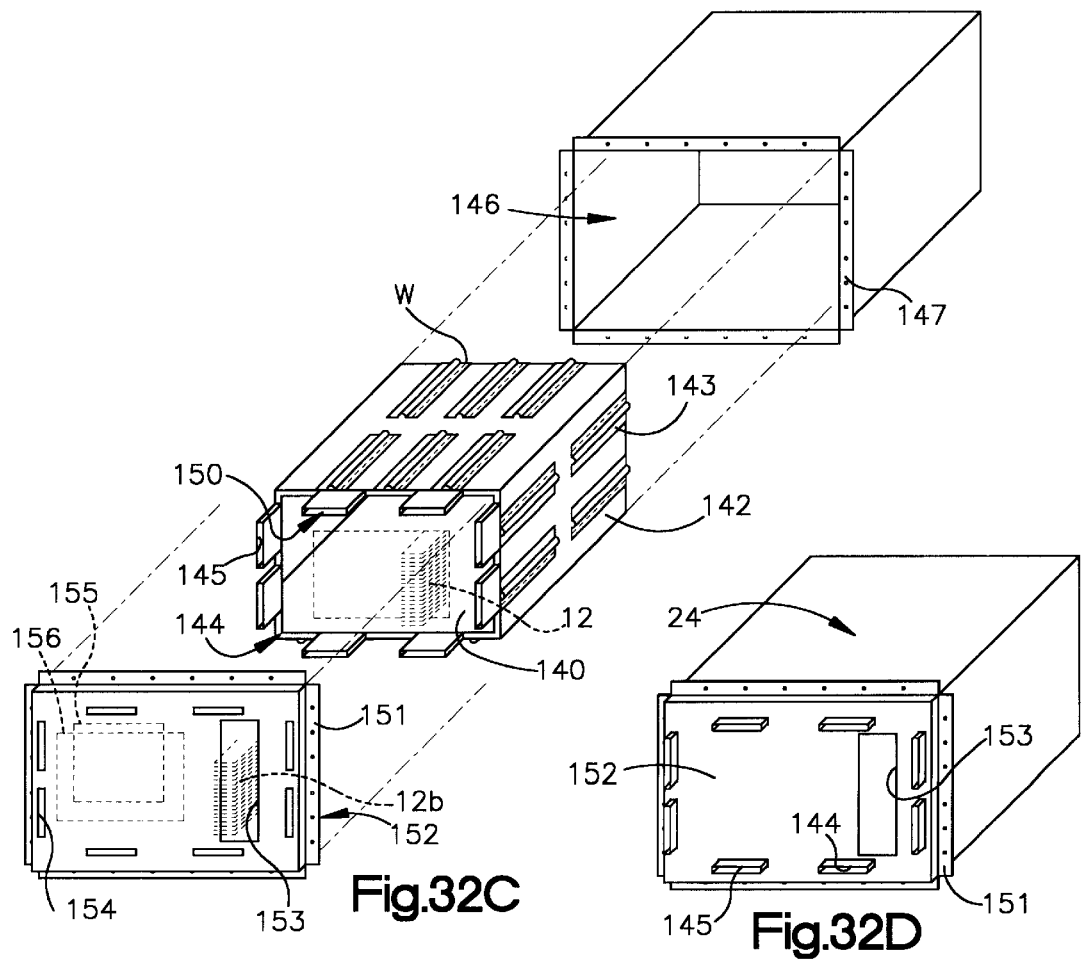

The stacked cells are best illustrated in FIG. 31, while the arrangement of the thermal shell components is further shown in FIGS. 32–34. In the thermal shell 24, a stack duct member 140 surrounds the insulated cells 12, which is then surrounded and engaged by an exhaust duct 142, as shown in step A of FIG. 32. The ducts are each manufactured of 0.008 inch Alpha IV steel or 0.0155 inch Inconel 600, and are slid into engagement. The external surfaces of the ducts each include partial cylindrical spacers 143 to provide air spacing for heat exchange between the ducts, and also as shock absorbing materials 26. The spacers are welded to their respective ducts as indicated at W, such that only one leg of the spacer 143 is welded and the other is movable with respect to the duct to permit flexing of the spacer under compression.

The space inside the stack duct 140 and cell stack provides an incoming air passageway 148. The space outside the stack duct 140 provides an exhaust air passageway 150. A gas bypass 144 is provided, which is a ring member having rectangular openings 145 extending therefrom for directing exhaust air flow as illustrated in FIG. 30 via the openings 145. The gas bypass 144 is hermetically welded to the exhaust duct 142, such that hot exhaust air is removed from the device only after wrapping through the thermal shell for cooling purposes as in FIG. 30.

The ducts assembled in step B of FIG. 32 are then inserted into the incoming duct 146, which is secured about a flange 147 to the flange 148 of an incoming cap 152 by conventional fasteners. A further incoming air gap 148' is provided intermediate the exhaust duct 142 and incoming duct 146. The incoming cap 152 includes a stack opening 153 for receiving the arms 12b of the stacked cells 12. Openings 154 for mating engagement with the openings 145 in the gas bypass 144 are also provided. To ensure sealing surrounding the incoming cap openings 154 and the gas bypass openings 145, a layer of Interam™ sealing material available from 3M, Corp., is provided between these members.

Intermediate the stacked cells 13 and the incoming cap 152, two additional components to increase the temperature within the cell stack are also provided. Closest the stacked cells a conventional finned heat sink 155 is provided. Immediately adjacent the heat sink, a conventional mica heater 156 is provided of the type available from Minco.

To seal the end of the thermal shell 24 opposite the incoming cap 152, a layer of Interam™ sealing material 168 is provided between the incoming duct 146 and an exhaust cap 170 as shown in FIG. 33A. Upon heating, the Interam material 168 expands to lock the exhaust cap 170 in place and form a gas tight seal to prevent leakage.

The exhaust fan 30, a conventional fan capable of drawing approximately 60–65 liters per minute of air through the device 10 for the design requirements of the preferred embodiment, is included on the incoming cap 152 end of the thermal shell 24. The fan 30 is attached to a fan duct 172 via conventional fasteners over a fan opening 173. The fan duct additionally includes an incoming air access 174. A flange 176 of the fan duct 172 is then secured to the flange 151 of the incoming air cap 152 via conventional fasteners. Once these components are assembled, additional layers of high (closest to the cell stack) and low insulation materials 28 are provided as shown in FIG. 31. The assembly may then be placed within the external container 40. As illustrated in FIG. 2, the additional insulating material 28 used is a polyimide thermal insulation sheet. Further shock absorbing materials 26 are also found in the threaded posts which engage and are secured to the container on one end, and sandwich the thermal shell 24 positioned within the container 40 using the conventional fasteners illustrated.

Control and Operation of the Oxygen Generating Device

Figure 35:
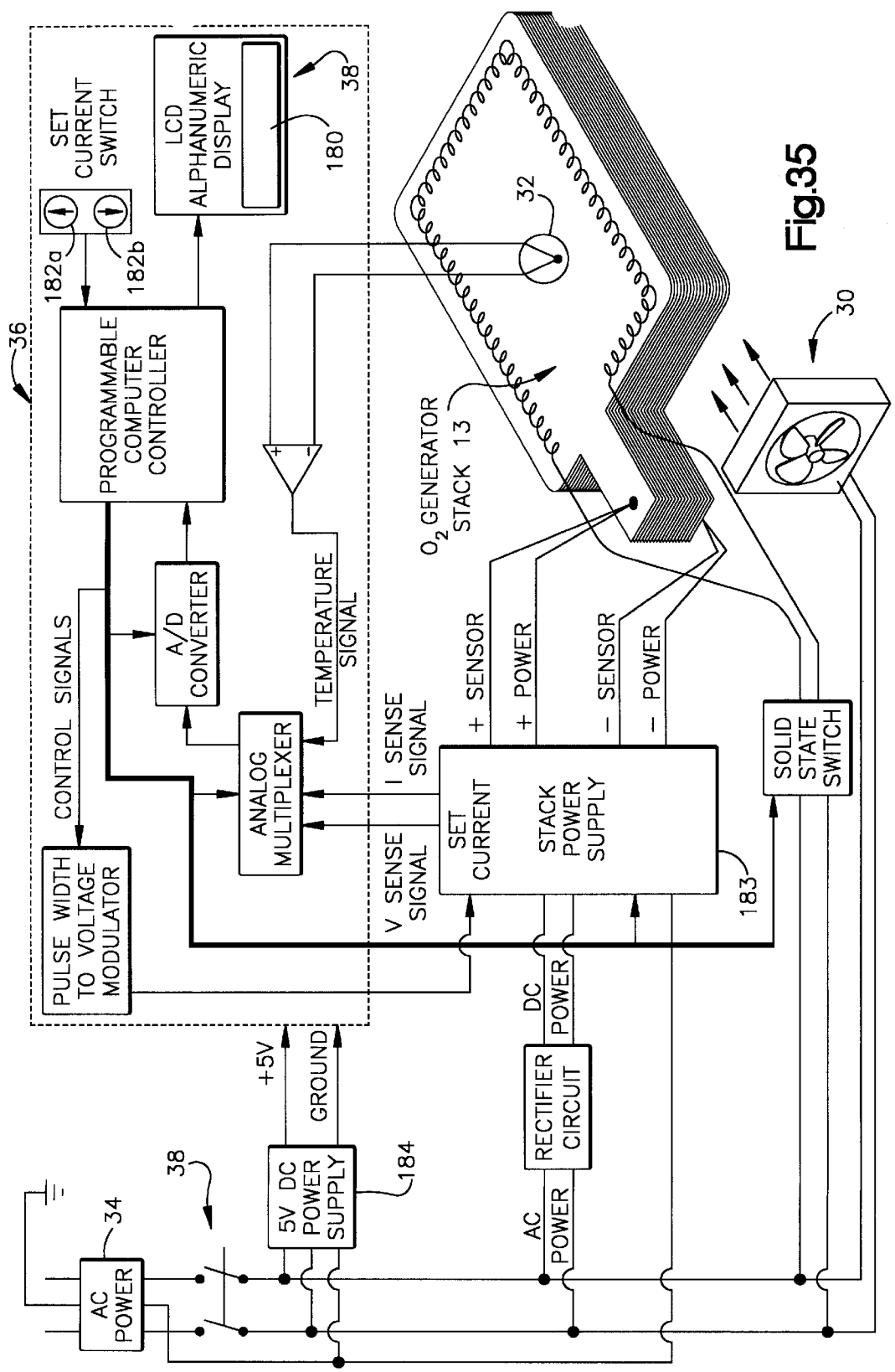
FIG. 35 is a partial, schematic representation or block diagram illustrating the power controls and circuitry of the device of the present application.

To operate the device and obtain oxygen from oxygen output 44, the user operates the computer user interface 38 to power on/off the device 10. The computer user interface 38 and oxygen output 44 are supported within the metal container 40 which surrounds the components of the device. In the preferred embodiment, the output 44 includes a conventional quick disconnect fitting 45. As shown in FIG. 35, once in the on position, the operator is provided with an LCD display 180 providing output and operation status data.

The LCD screen displays user selected stack current (0–18 amps), actual stack voltage (0–12 V), actual stack current (0–18 amps), stack heat element status (on/off), and the stack temperature (472°–727° C.). Using these data, the operator is able to increase and decrease the current provided across the cells using an up push-button and a down push-button 182a, 182b to correspondingly increase and decrease the amount of resulting oxygen. The control of oxygen output is illustrated in the graph of FIG. 34 which shows the control provided to the operator during use of the device 10.

To operate the device and obtain the reaction of FIG. 3 for oxygen generation, electrical flow is provided across the cells by the interconnection of the power source leads 162 with the power source 34 as shown in FIG. 31. Flow is in the direction indicated and as previously described. Additionally, the cells must be maintained at a high temperature, preferably in the range of 575° C. to 600° C. A heat element is thus provided, and may be individual resistance elements, such as the heat strip, heat wire or paste systems previously discussed. In addition to the individual heat elements on each cell, or in the preferred embodiment as an alternative, a heat element which is external to the cell stack may also be provided as illustrated in FIGS. 27 and 28. Still further heat elements may also be provided, such as the mica heater 156 near the exhaust fan.

The power source 34 providing electrical power to the device may be a conventional AC power line or alternatively may be battery operated, as may be necessary for providing an ambulatory unit. The preferred device may be operated using 110 or 120 V electrical power. Where batteries are used, lithium ion batteries which are rechargeable for providing a portable device are preferred. Additionally, to conserve battery power, a pulse conservation control sensor may be provided. Such a sensor reduces use of the device by operating only when output is desired. For example, where the device is used for medical oxygen supply, the device would only output oxygen during inhalation or the first part thereof. To keep the pulse conservation oxygen pulse in phase with the respiration cycle, a dual lumen intra-tracheal tube may be used, wherein one lumen, the inner lumen, contains oxygen, and the second lumen, the outer lumen, contains oxygen or air or air and oxygen. In such an embodiment, the chest inflation would be initiated by the oxygen pulse from the first lumen. This type of operation reduces the operating time of the device to extend the battery life. Typically a negative pressure sensor is used to detect inhalation. The oxygen output may be regulated either by providing a pulse signal to the cell stack when inhalation occurs, or by providing the pulse signal to regulator valve interconnected with the sensor.

In the event an AC power line is the power source, a conventional AC line filter is also preferred to reduce electrical noise generated by the device. The current through the stack is generated using a DC 200 Watt power supply 183, which is an Astec AM80A. The output voltage and current of the power supply are monitored for reliable operation. It should be understood that the DC power driving the cell stack 13 may be chopped or otherwise modulated to optimize stack efficiency or performance of the device. A 5 V DC power supply 184 is provided, as shown in FIG. 35, to supply the device controls including the programmable computer controller 36 and interconnected electronic control circuitry. These device controls supply current to the cell stack and to the heat element. The power generated by 5V power supply 184 is first reduced with a transformer, the output voltage is rectified, the power is filtered with a capacitor, regulated. The exhaust fan 30 may be connected directly to the power source, or, in the event programmed computer control of fan operation is desired, powered through the power supply 183. The remainder of the electronic control operation is set forth in FIG. 35.

Figure 12A:
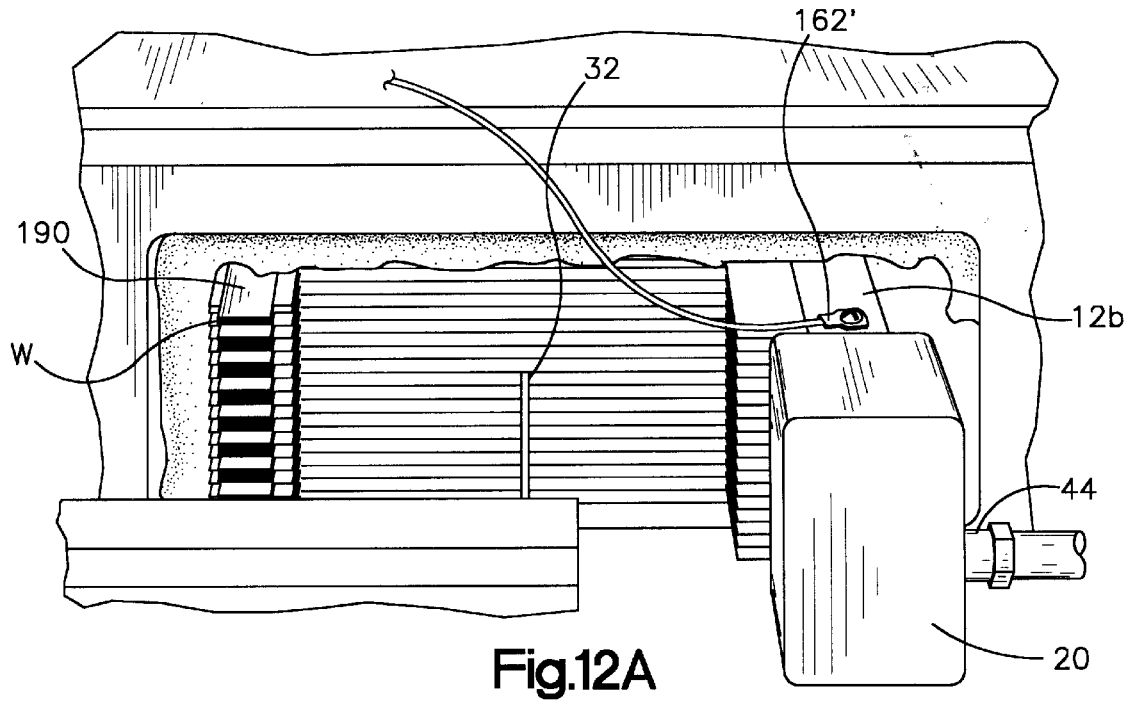
FIGS. 12a and 12b are schematic, partial perspective views of ends of the embodiment of the device of FIGS. 1 and 2 having a cell stack with heat elements extending therefrom.
Figure 12B:
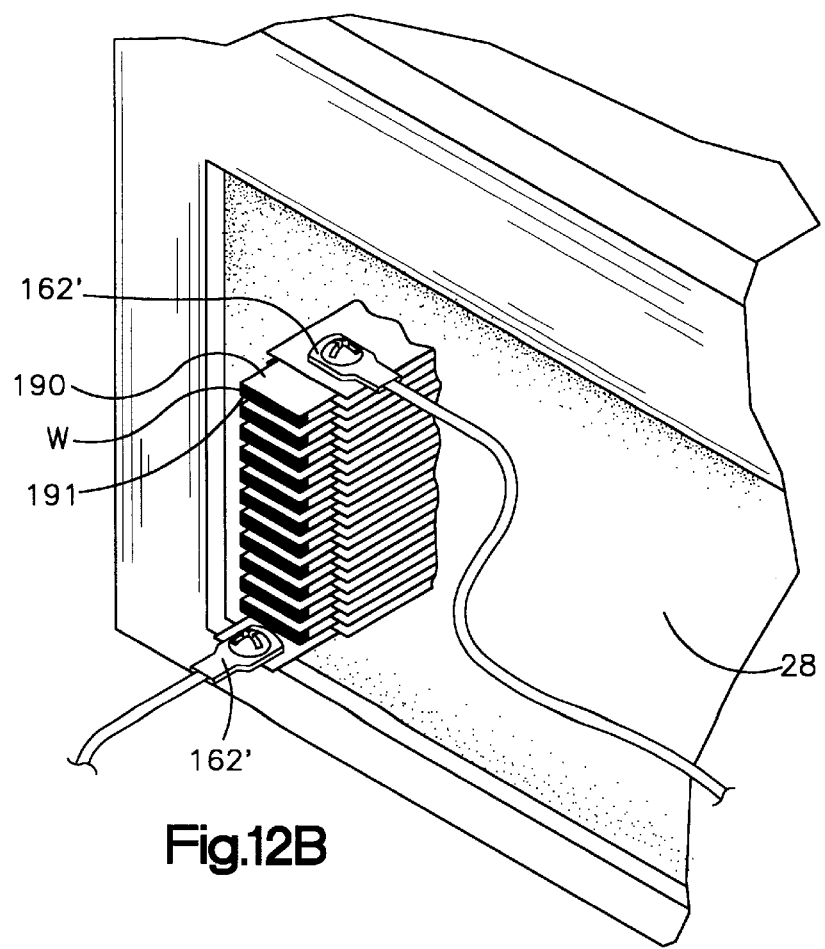

The temperature is controlled by sensing the internal temperature of the device during operation. Thermocouple sensors 32 are secured approximately within the center of the cell stack, as shown in FIG. 12a. The sensors 32 are interconnected with the computer controller 36, positioned within the container 40, to provide system and user feedback using operating information concerning the temperature. Based on the sensed temperature, the appropriate amount of power is provided to the resistance heat element. It is noted that the thermocouple and power source lead connections are all in communication with the cell stack via the oxygen egress spaces. In the event additional sealing is required surrounding these components, Interam material may be used.

Using the conventional programmable computer controller 36 including interconnected control circuitry, once the device is turned on, cell stack 13 is heated to a preprogrammed operating temperature and held it at that temperature using the sensors and feedback controls discussed and illustrated in FIG. 35. The controller 36 is a Parallex Basic Stamp II microprocessor. Four different temperature ranges control the rate of heating. At temperatures below 477° C., the heat element is operated at a fixed cycle temperature or warm-up rate. Between 477° C. and a programmed break-point temperature, the heat element is operated at a duty cycle temperature or the maximum heating rate. The break-point temperature is a few degrees below the resulting set-point temperature. Above the break-point temperature, the heat element the duty cycle temperature decreases by 5% per degree until a few degrees above the effective set-point temperature, when the duty cycle decreases to 0, where it remains for all higher temperatures.

Once the cell stack 13 is at the desired temperature, the up and down push-buttons 182a, 182b, may be used to increase and decrease the current applied to the cell stack. When current is applied to the stack, the voltage measurement monitors the resistance of the stack which is highly dependent on the operating temperature, and the electrochemical potential generated by the difference in oxygen concentration across the cells. It is noted that a current disable feature is preferably provided such that the current is disabled unless the stack is at the appropriate operating temperature.

The temperature break-point, warm-up rate and maximum heating rate may be pre-programmed such that the user cannot make operational changes. Alternatively, the device may be adjustable, such that programming changes are possible. In the device of FIG. 1, simultaneous operation of the up and down push-buttons places the controller 36 in programming mode such that the five device operations may be adjusted as desired.

Figure 36:
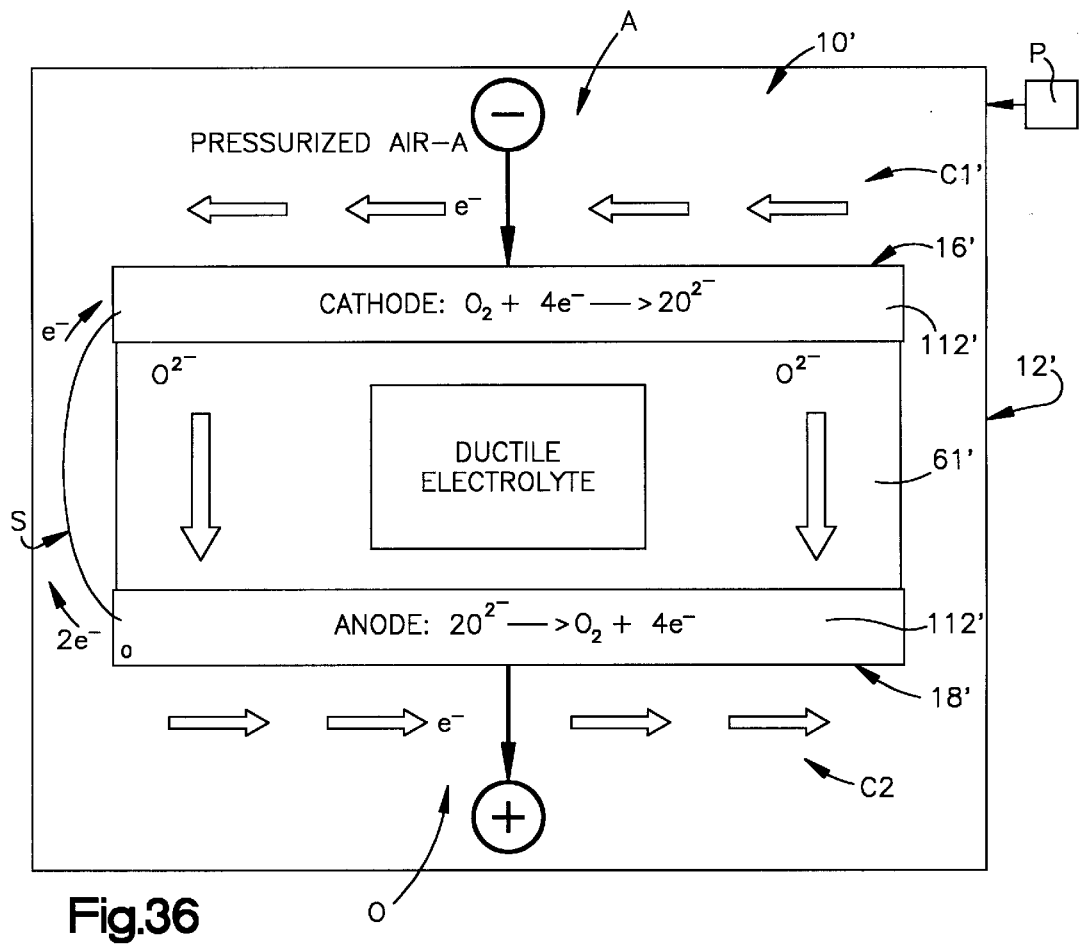
FIG. 36 is a schematic block diagram representation of an alternate ceramic composite cell of the device showing the pressure driven flow of electron exchange through the device during operation.

A still further alternate embodiment of the device 10' is schematically illustrated in FIG. 36. The device 10' is provided with a pressurized air plenum C1' for driving oxygen generation by the device. As shown, air is provided to the air plenum C1' under a pressure by a conventional pump P for communication with the cathode 16' of the ceramic composite material 61'. The resulting operating condition is that the absolute pressure of the oxygen within the air plenum C1' is greater than the absolute pressure of the oxygen within the oxygen plenum chamber C2' To provide sufficient electrons at the electrode layer 112' of the cathode 16' of the cell 12', a short circuit S, such as a wire, is provided to interconnect the electrode layer 112' of the anode side 18' of the cell 12'.

Figure 37:
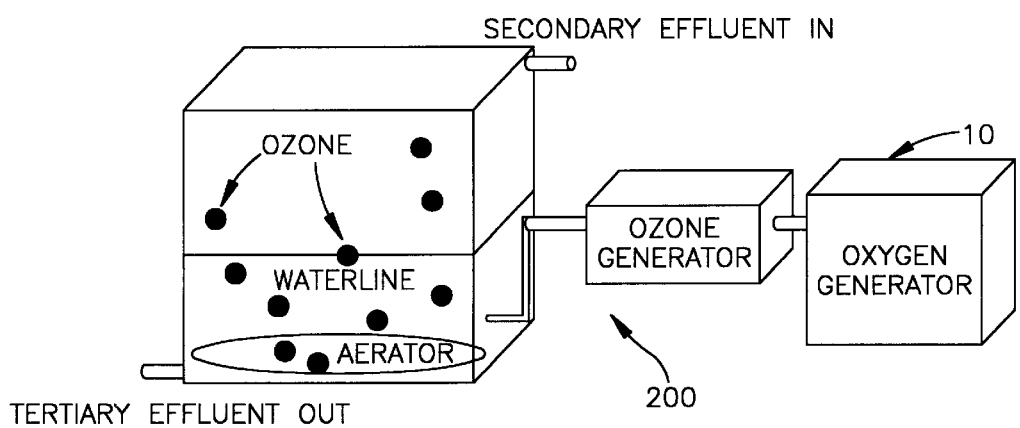
FIGS. 37 and 38 are schematic block diagrams of components of an ozone generating system for treating liquid waste.
Figure 38:
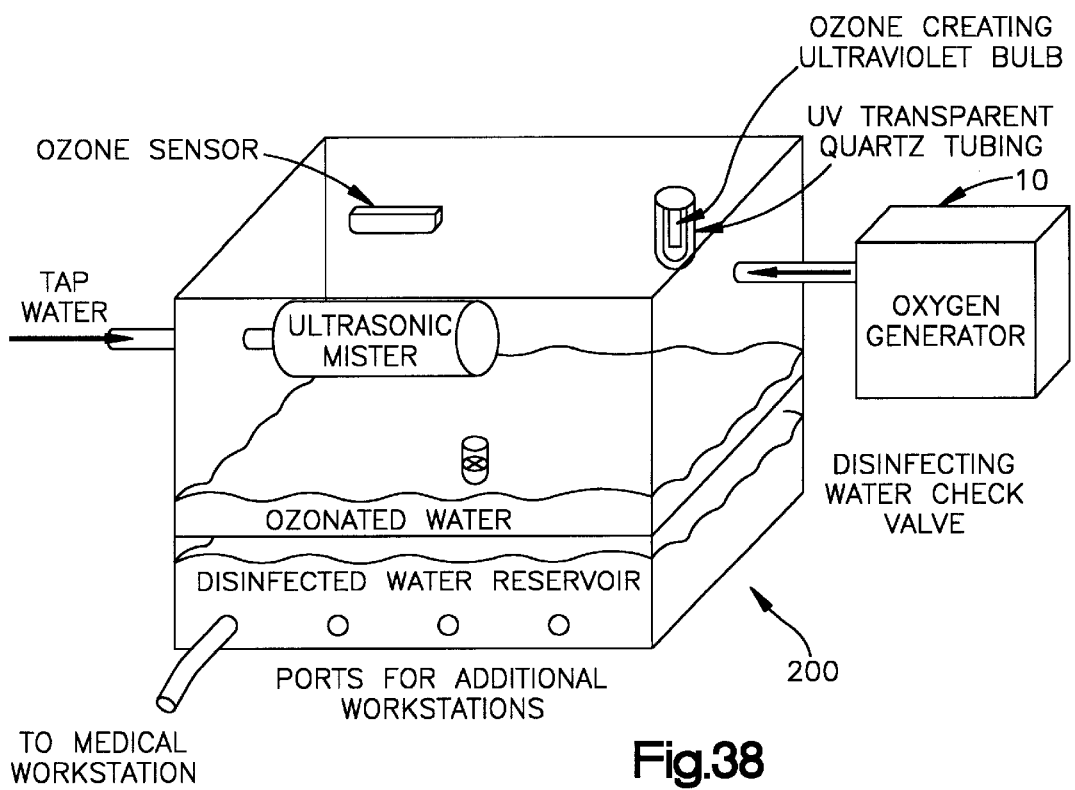

The present oxygen generating system may also be conveniently used in connection with the production of ozone $O_3$. The proposed ozone generating systems 200 of the present application typically result in 2% ozone gas from 98% oxygen. As illustrated in FIGS. 37–38, the generation of ozone using the present oxygen generating device 10 may be readily adapted for use in connection with waste water treatment operations, as well as to provide disinfected water for disinfecting, sterilizing or medical uses, such as in a dentist's office.

Figure 38A:
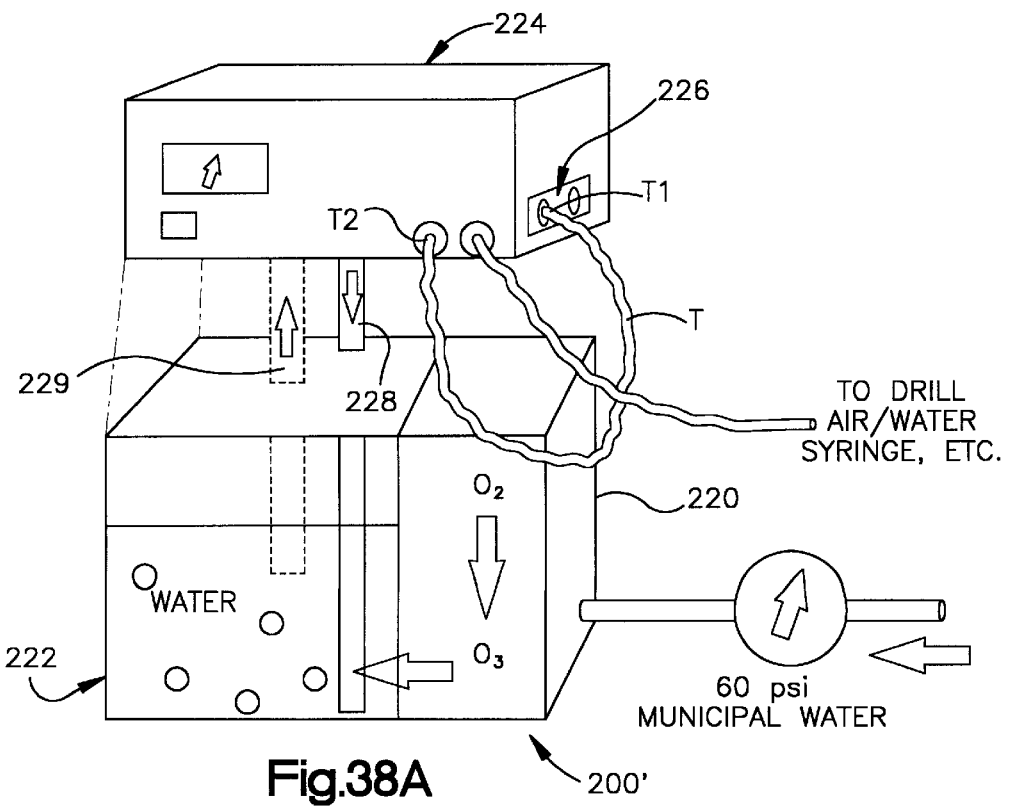
FIG. 38a is a schematic block diagram of an ozone disinfectant feed for dental unit water line purification.

FIG. 38a illustrates a preferred ozone generating system 200' for use in conjunction with a dental instrument unit 224 for distribution of water to the dentist's tools. As shown, oxygen and ozone are generated within the system in a compartment 220. The ozone is then supplied to a water reservoir 222 by diffusion. The ozonated water is supplied to the dental instrument unit 224 via conduit 229. The conventional dental instrument unit 224 is also provided with quick connect ports 226 for connection of the tool end T1 of the dental water lines T, as illustrated. Once connected, a disinfecting procedure may then commence. By connecting the tool end T1 of the line T at the ports 226, a closed loop is created and disinfecting ozonated water is circulated by and from the unit 224 through the line T for removing biofilm from the inside of the line. During the disinfecting procedure, waste water used for removing the biofilm is recirculated back to the reservoir 222 via conduit 228. The water is circulated through the lines T and within the reservoir 222 and unit 224 until the disinfection procedure is complete.

Figure 39:
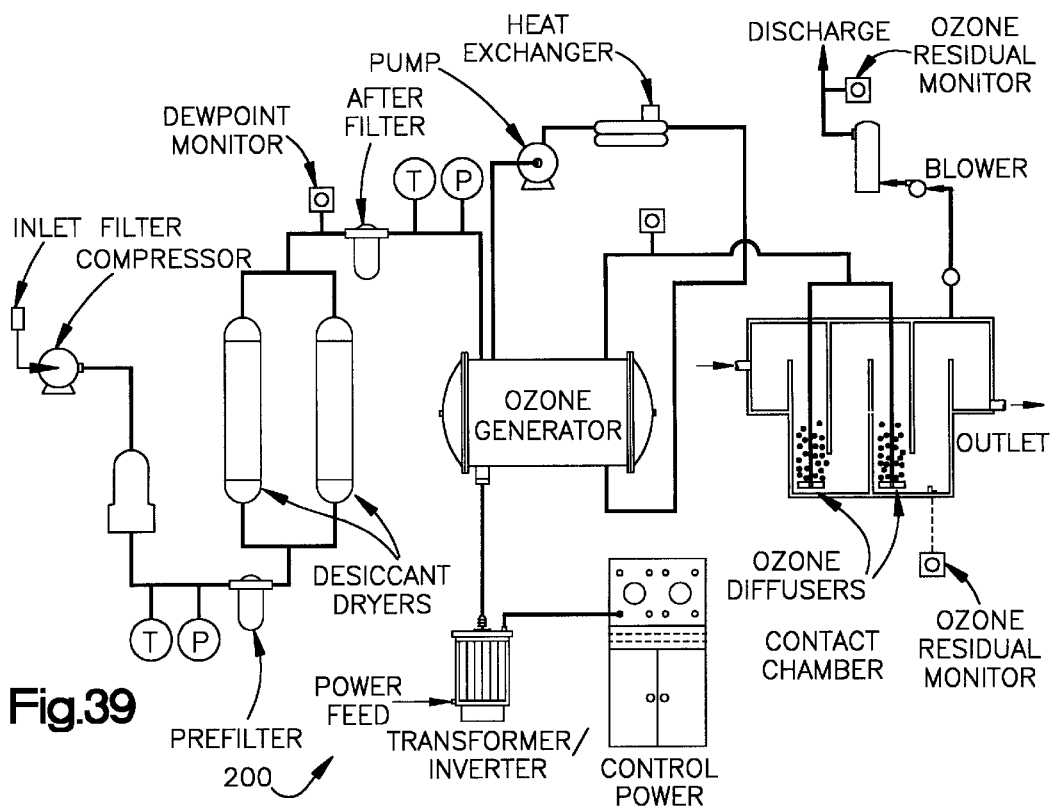
FIG. 39 is a schematic block diagram of the components of an ozone generating system for providing disinfecting liquid for use from an outlet.
Figure 40:
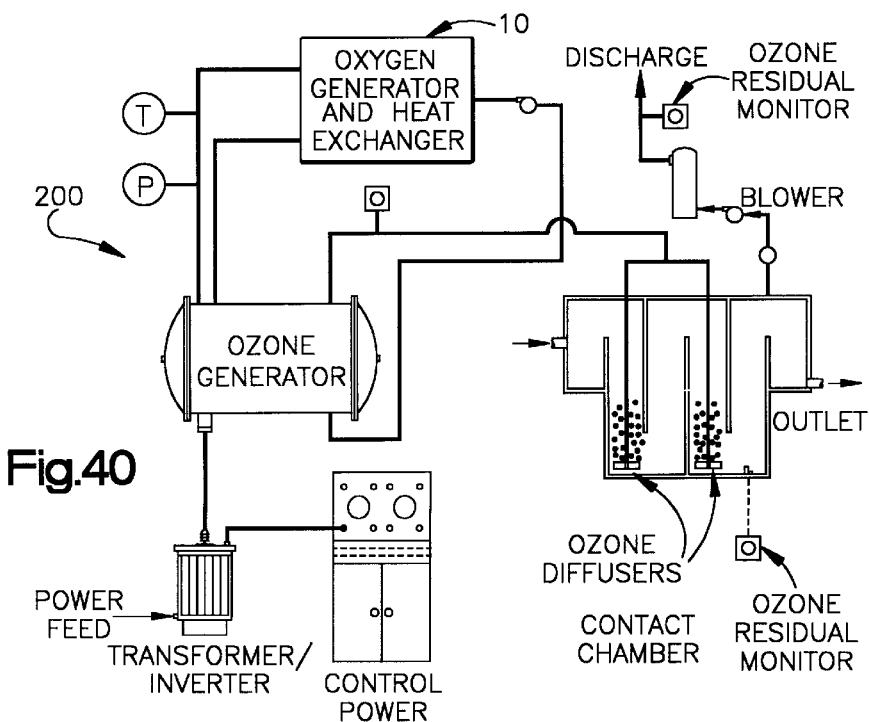
FIG. 40 is a schematic block diagram of the components of an ozone generating system for providing disinfecting liquid for use from an outlet, which system uses the oxygen generating device of the present application.

Still further, the generation of ozone may be particularly useful in connection with the treatment of contaminated food. FIG. 39 illustrates an ozone system wherein a body or stream of water is saturated with ozone using the device 10 of the present invention. The resulting disinfecting liquid would be very useful in any application where disinfecting sprays are be required, such as commercial food processing. FIG. 40 illustrates a comparable system where the device 10 is not used.

The preferred forms of the device 10 has been described above. However, with the present disclosure in mind it is believed that obvious alterations to the preferred embodiments, to achieve comparable features and advantages in other assemblies, will become apparent to those of ordinary skill in the art.

We claim:

1. A solid state electrolytic device utilizing a ceramic and metal composite solid electrolyte material for generating oxygen by the passage of electrical current comprising:

a plurality of electrically connected solid state electrolytic oxygen generating cells, each of said cells including a ceramic body with first and second electrically conductive porous gas permeable electrode layers on opposite surfaces of said ceramic composite body, said first layer forming an anode and said second layer forming a cathode, and a bipolar metal member having contact portions extending outwardly in two directions from a plane of the bipolar metal member for engagement with said ceramic composite body of said cell on one side, and with said ceramic composite body of another adjacent cell on the other side, said ceramic composite body further comprising a metal member having a regular hole pattern of openings formed by metal photolithographic techniques within a center portion of the metal member for supporting and containing a ceramic solid electrolytic material and such pattern and openings have no sharp corners, said bipolar metal member and said metal member of said ceramic composite body interconnected at a gas tight seal which is a mechanical weld surrounding said ceramic material to form an oxygen chamber, and together forming an oxygen output for removing oxygen generated in said oxygen chamber of said cell, said device further including a heat element for heating said plurality of cells to a desired reaction temperature, a gas manifold interconnecting said plurality of cells at said oxygen output of each cell, a fan for supplying air to said cathode of said cell, and a power source for electrically driving said plurality of interconnected cells to generate oxygen within said oxygen chamber.

2. The device of claim 1 wherein a thermal shell having first, second and third concurrent metal layers surrounding said plurality of electrically connected solid state electrolytic oxygen generating cells which are stacked in electrical series and gas parallel surrounded by shock absorbing and insulating materials.

3. The device of claim 1, wherein said cell further includes a frame surrounding and supporting said bipolar member.

4. The device of claim 3, wherein said frame comprises first and second members, said first member positioned for engaging said bipolar member, and said second member positioned for engaging said metal member of said composite body, and said first and second frame members are interconnected and said bipolar member and metal member are positioned intermediate said first and second frame members.

5. The device of claim 4, wherein said heat element comprises a resistive metal strip captured intermediate said first and second frame members.

6. The device of claim 5, wherein said heat element further comprises resistive heat plates partially surrounding said plurality of electrically connected solid state electrolytic oxygen generating cells.

7. The device of claim 1, wherein said bipolar metal member contact portions are hemispheric in configuration.

8. The device of claim 1, wherein the pattern of openings formed within said center portion of said metal member for supporting said ceramic material is a hexagonal close packed hole pattern.

* * * * *